United States Patent
Hajduczenia

(10) Patent No.: US 11,159,365 B2
(45) Date of Patent: Oct. 26, 2021

(54) APPARATUS AND METHODS FOR SYNCHRONIZATION PATTERN CONFIGURATION IN AN OPTICAL NETWORK

(71) Applicant: Charter Communications Operating, LLC, St. Louis, MO (US)

(72) Inventor: Marek Hajduczenia, Castle Rock, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 296 days.

(21) Appl. No.: 16/040,219

(22) Filed: Jul. 19, 2018

(65) Prior Publication Data

US 2019/0387293 A1  Dec. 19, 2019

Related U.S. Application Data

(60) Provisional application No. 62/685,793, filed on Jun. 15, 2018.

(51) Int. Cl.
*H04L 12/24* (2006.01)

(52) U.S. Cl.
CPC .......... *H04L 41/08* (2013.01); *H04L 41/0813* (2013.01)

(58) Field of Classification Search
CPC ............................ H04L 41/08; H04L 41/0813
See application file for complete search history.

(56) References Cited

U.S. PATENT DOCUMENTS

| | | | |
|---|---|---|---|
| 7,818,389 B1 * | 10/2010 | Chiang | H01M 4/926 709/212 |
| 8,493,982 B2 | 7/2013 | Borges et al. | |
| 8,554,080 B2 | 10/2013 | Hajduczenia et al. | |
| 8,619,591 B2 | 12/2013 | Zhang et al. | |
| 8,934,359 B2 | 1/2015 | Zhang et al. | |
| 9,497,076 B2 | 11/2016 | Hajduczenia et al. | |

(Continued)

OTHER PUBLICATIONS

Hamming, R. W., "Error detecting and error correcting codes", The Bell System Technical Journal, vol. 29 (2):, Apr. 1950, pp. 147-160.

(Continued)

*Primary Examiner* — Kevin C. Harper
(74) *Attorney, Agent, or Firm* — Gazdzinski & Associates, PC

(57) ABSTRACT

Apparatus and methods for discovery, synchronization and operation of network components. In one embodiment, the network comprises a passive optical network (PON), and the components being synchronized include an enhanced OLT (eOLT) and one or more enhanced ONUs (eONUs). The eOLT is configured in one variant to utilize control protocol messaging (such as those used in the MPCP or Multi Point Control Protocol) to communicate particular synchronization parameters and durations to the eONU(s), whether individually or via multicast/broadcast. The synchronization parameter and durations are selected to optimize discovery and synchronization of the eONU(s) with the eOLT, and also optimize (subsequent) normal operation, in one implementation through selection of synchronization patterns which enable most efficient AGC determination, clock recovery (CDR), SBD, and EBD identification.

20 Claims, 14 Drawing Sheets

(56) References Cited

U.S. PATENT DOCUMENTS

| | | | |
|---|---|---|---|
| 9,590,847 B2 | 3/2017 | Hajduczenia et al. | |
| 9,674,035 B2 | 6/2017 | Hajduczenia et al. | |
| 2002/0172294 A1* | 11/2002 | Cheng | H04L 27/233 |
| | | | 375/281 |
| 2004/0146064 A1* | 7/2004 | Kramer | H04L 12/403 |
| | | | 370/448 |
| 2007/0133800 A1* | 6/2007 | Kim | H04L 63/0428 |
| | | | 380/256 |
| 2009/0123159 A1* | 5/2009 | Leung | H04L 7/042 |
| | | | 398/154 |
| 2009/0175295 A1* | 7/2009 | Ide | H04Q 11/0067 |
| | | | 370/465 |
| 2010/0316379 A1* | 12/2010 | Suvakovic | H04L 7/041 |
| | | | 398/58 |
| 2010/0316380 A1* | 12/2010 | de Lind van Wijngaarden | H04Q 11/0066 |
| | | | 398/58 |
| 2012/0141139 A1* | 6/2012 | Bakhru | H04B 10/272 |
| | | | 398/158 |
| 2012/0254651 A1* | 10/2012 | Hood | H04Q 11/0067 |
| | | | 714/4.1 |

OTHER PUBLICATIONS

Kramer G et al., "Interleaved Polling with Adaptive CycleTime (IPACT): Protocol Design and Performance Analysis", Jul. 2001.

Zheng, et al., "Media Access Control for Ethernet Passive Optical Networks: An Overview," IEEE Communications Magazine, 2005, pp. 145-150.

* cited by examiner

APPARATUS AND METHODS FOR SYNCHRONIZATION PATTERN CONFIGURATION IN AN OPTICAL NETWORK

PRIORITY

This application claims priority to U.S. Provisional Patent Application Ser. No. 62/685,793 filed Jun. 15, 2018 of the same title, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of optical networking, and specifically in one aspect, to apparatus and methods for synchronization configuration within PONs (passive optical networks).

2. Description of Related Technology

Passive optical networks (PONs) are comparatively low-cost Fiber-to-the-Building/Curb/Home (FTTb, FTTc, FTTh, collectively referred to as FTTx) solutions. A PON is a point-to-multipoint optical network that allows service providers to minimize the need for fiber in the outside portion of the network to interconnect buildings or homes. The basic principle of PON, as illustrated in the architecture 100 of FIG. 1, is to share the central optical line terminal (OLT) 102 and the feeder-fiber by as many optical network units (ONUs) 104 as is practical. This resource sharing allows a significant reduction of network capital expense allocated to each subscriber and therefore enables broadband fiber access in areas where achieving profitability has been a formidable task for traditional point-to-point or ring-based architectures.

Various types or variants of PONs exist. For example, those based on the ITU-T G.983 standard utilize Asynchronous Transfer Mode (ATM) and are typically referred to as APON (ATM PON). The final version of ITU-T G.983 is referred to more often as broadband PON, or BPON. A typical APON/BPON provides 622 megabits per second (Mbit/s) (OC-12) of downstream bandwidth and 155 Mbit/s (OC-3) of upstream traffic, although higher data rates may be accommodated by G.983 systems.

Gigabit Ethernet PON (GPON) provides multiple Layer 2 networks, including: (i) ATM for voice, (ii) Ethernet for data, and (iii) a vendor specific or proprietary voice data encapsulation protocol. Data rates on the order of 1.25 Gbit/s to 2.5 Gbit/s downstream and upstream are provided. However, GPON does not support multicast services, and hence delivery of Internet Protocol (IP) data is more bandwidth-consuming than other approaches with multicast.

Additionally, higher data rate system (e.g., those capable of 10 Gbit/s or higher) are already being developed. For instance, so-called XG-PON (10 Gbit/s downstream and 2.5 Gbit/s upstream), specified by ITU G.987, 2009, is fundamentally a higher-bandwidth version of GPON. It has similar capabilities as GPON and may co-exist on the same fiber.

XGS-PON (10 Gbit/s both downstream and upstream) is specified by ITU G.987.1, 2016. XGS-PON is a higher-bandwidth, symmetric (U/D) version of GPON. XG-PON1 is specified in ITU G.987.2.

NG-PON2 (10 Gbit/s downstream and upstream, as well as 10 Gbit/s downstream and 2.5 Gbit/s upstream) is specified under ITU G.989, 2015 and enables added capabilities like wavelength mobility and channel aggregation or bonding.

Ethernet PON (1G-EPON) generally delivers 1 Gbit/s symmetrical bandwidth, and uses a Layer 2 network that leverages IP to carry data, voice, and video. Advantageously, EPON equipment does not require multi-protocol conversions, and the result is a lower cost of implementation (including lower silicon costs) as compared to e.g., GPON discussed supra. The higher speed version of EPON is also available (10G-EPON), providing symmetrical bandwidth up to 10 Gbit/s. Even higher data rate EPON systems will become available in the future, providing 25 Gbit/s and 50 Gbit/s symmetric data rates and currently being standardized under the IEEE P802.3ca project.

In general, and regardless of the technology/protocol used, PONs are typically based on a point-to-multipoint (P2MP) passive outside fiber structure, where the OLT 102 located in the Central Office (CO/hub) of the local service provider provides connectivity to a number of subscriber equipment modules (ONUs 104), the location of which depends on the deployment scenario.

As the name suggests, the outside fiber plant between the OLT and the ONU is completely passive, requiring no power to operate. This reduces any OPEX (operational expense) once the fiber is deployed. Deployment of the fiber may be according to any number of layouts, including being buried underground, placed on aerial poles typically shared with local power company, or in a mixed scenario, where both underground and aerial deployment is used to optimize the cost.

So-called "TDMA PON" uses Time Division Multiple Access (TDMA) in the upstream direction, where multiple ONU transmitters are sending data to a single receiver at the OLT, with arbitration between individual ONUs controlled by the OLT, and individual ONUs being allocated dedicated transmission slots (opportunities) in the upstream direction. To achieve TDMA operation in the upstream direction, all ONUs connected to the OLT are temporally synchronized.

Downstream Transmissions

In the downstream direction (i.e., from OLT to ONUs), data frames that are broadcast by the OLT 102 pass through a single passive splitter/combiner (PSC), or a cascade of PSCs, to reach the ONUs 104. Each ONU receives part of the transmitted downstream signal. The downstream channel properties in this PON system make it a shared medium network: packets broadcast by the OLT are selectively extracted by the destination ONU, which applies simple packet-filtering rules such as those based first on a logical link identifier, and then based on MAC address. Depending on the underlying PON technology, i.e., whether it is EPON (PON using Ethernet framing, as defined in IEEE Std 802.3), or GPON/XG-EPON/XGS-PON (PON using GEM framing, as defined in a number of recommendation series published by ITU-T such as SG15Q2 referenced supra), the aforementioned logical link identifier can take various forms. For instance, the logical link identifier may have the form of the Logical Link ID (LLID) set forth IEEE Std 802.3 (Clause 65 for 1G-EPON, and Clause 76 for 10G-EPON, each incorporated herein by reference in its entirety), another format for GPON, and yet another format for other PON technologies.

FIG. 1 illustrates an example of downstream operation in an extant EPON architecture.

Upstream Transmissions

In the upstream direction (see FIG. 2)—i.e., from the ONUs 104 towards the OLT 102—any PON looks like a multipoint to point (MP2P) network. Multiple ONUs may transmit simultaneously towards a single receiver at the OLT. Since the specific PON physical constraints do not allow the ONUs to see any data transmissions originating from other subscriber units, implementation of multiple access/arbitration schemes such as Carrier Sense Multiple Access with Collision Detection (CSMA/CD) is not feasible. See, e.g., J. Zheng and H. T. Mouftah, "Media Access Control for Ethernet Passive Optical Networks: An Overview," *IEEE Communications Magazine*, pp. 145-150, 2005, incorporated herein by reference in its entirety. Obviously, without a centralized form of arbitration, transmissions from individual ONUs would collide at the trunk section of the fiber, overlapping and resulting in, inter alia, unrecoverable data errors.

ONUs in a typical PON network belong to a single collision domain, and thus a centrally managed channel access is required, such as one implemented via TDMA. In such architectures, ONUs in their default state are not allowed to transmit any data unless a "permissive" event or state occurs, such as e.g., by being polled specifically by the OLT to transmit. In this way, data collisions are avoided, since the central OLT controller at any moment of time is aware of the scheduled transmissions from individual ONUs, such as via the mechanisms of data reporting defined in Multi Point Control Protocol (MPCP) per IEEE Std 802.3, previously incorporated herein. Similar mechanisms are also implemented in ITU-T SG15Q2 recommendations for GPON-series PON systems.

In the upstream direction, any existing TDMA PON operates in multipoint-to-point arrangement, where multiple ONUs transmit towards a single receiver at the OLT. In such an arrangement, some sort of arbitration is required to avoid temporal overlap among transmissions originating from individual ONUs. Various arbitration protocols for the upstream direction have been proposed to date, with the time slotted (e.g., TDMA) with scheduling pipelining (similar to IPACT; see "*Interleaved Polling with Adaptive Cycle Time (IPACT): Protocol Design and Performance Analysis*;" Kramer, G., et al, July 2001, incorporated herein by reference in its entirety) is used predominantly in commercial products. More exotics protocols, relying on modified versions of Ethernet CSMA/CD or CSMA/CA (CSMA with collision avoidance) mechanisms have proven too inefficient to provide SLA (service level agreement) guarantees required for commercial deployments to compete with services provided over P2P or other media.

In the aforementioned default state, the laser in an ONU is turned off. This, inter alia, prevents the generation and accumulation of optical noise in the upstream direction. Such optical noise can degrade the OLT receiver's capability to receive data from more distant ONUs (i.e., those with weaker signal due to propagation losses), or introduce bit errors into the transmission by degrading the Signal-to-Noise Ratio (SNR).

In an EPON, when a scheduled upstream transmission (time) slot begins, there is some data queued for transmission, and the MPCP (Multi-point Control Protocol) layer in the ONU starts transmitting data towards the physical medium. A Data Detector (DD) function in the PON PHY identifies the start of the upstream transmission. The Data Detector function (see for example IEEE Std 802.3, Section 76.3.2.5 for details applicable to EPON) identifies the beginning of the upstream transmission burst, and enables or turns on the ONU laser when the first data block reaches the FIFO delay buffer. Additionally, the Data Detector block adds a certain amount of delay into the transmission path, the delay sufficient to prepare the transmit laser (i.e., turn the transmit laser on, stabilize its output power, and transmit a synchronization pattern) before the actual queued data is transmitted. This guarantees that the ONU transmit laser has enough time to reach the optimum operating point and sufficient amount of synchronization pattern is transmitted to aid the operation of Automatic Gain Control (AGC) and Clock Data Recovery (CDR) blocks in the OLT receive path. While the FIFO buffer contains at least one data block, the transmit laser in the ONU remains enabled. Similar functionality exists in GPON systems as well.

A typical synchronization pattern terminates with a very specific sequence, referred to as the Start-of-Burst delimiter (SBD) or Burst Start (BS) delimiter. The SBD pattern allows the OLT receiver to unequivocally identify the beginning of the FEC (forward error correction)-protected portion of the upstream burst, containing actual queued data being transmitted by the ONU towards the OLT. The BS pattern typically has specific mathematical properties, allowing the OLT receiver to detect it with high confidence even in the presence of bit errors introduced by the transmission channel. Only when the last data block leaves the FIFO buffer, the Data Detector block switches the transmit laser off, again transmitting the synchronization pattern as the laser switches off.

Exemplary operation of the Data Detector in the transmit path in the ONU 104 is shown in FIG. 3.

The depth of the FIFO buffer within the Data Detector block may be adjusted dynamically to, inter alia, optimize the burst structure and minimize the burst overhead (laser on/off periods, synchronization time, etc.), thereby improving the upstream transmission efficiency.

In the exemplary EPON system, during the MPCP Discovery process, the ONU and OLT negotiate the duration of various burst overhead elements, where the OLT announces the minimum required duration of the synchronization time (i.e., the *Sync Time* field in the Discovery GATE MPCPDU, see IEEE Std 802.3, Section 77.3.6.1), and the ONU announces the minimum required laser on and off times (*Laser On Time and Laser Off Time fields in the REGISTER_REQ* MPCPDU, see IEEE Std 802.3, Section 77.3.6.3). The value of these parameters is implementation-dependent, and the negotiation mechanism between the ONU and OLT allows for support of a wide range of implementations, as well as mixing ONUs with different hardware capabilities connected to one and the same OLT.

The resulting upstream burst structure 400 in 10G-EPON is shown in FIG. 4 (individual fields not necessarily to scale), and comprises the following specific fields/areas:

1. Laser On (402): The ONU transmitter is being switched on and ramps up towards the optimum operating conditions.
2. Sync Time (aka "Burst Preamble") (404): The ONU transmits repeatedly the synchronization pattern to aid the operation of AGC and CDR blocks within the OLT receiver. The BS pattern is counted as part of the Sync Time block, and designates the end of the Sync Time and the start of the FEC-protected portion of the upstream burst. The Sync Time period is used for proper detection of the incoming data burst, configuration of the gain unit in the OLT receiver, and clock recovery to synchronize to the incoming data stream.

3. Burst Payload (406): The Burst Payload comprises a series of FEC codewords, where each codeword comprises FEC payload (actual user data) and FEC parity (added to improve resilience against bit errors). The size of the Burst Payload in the exemplary case of 10G-EPON is an even multiple of the size of the FEC codeword, since codeword shortening is not supported. A similar situation takes place in 1G-EPON, where FEC codewords (when FEC is enabled) are always transmitted as whole. In GPON systems, upstream burst transmission may be truncated, and individual data frames fragmented as needed to fit into the allocated transmission slot.

4. Burst End (BE) pattern (408): The BE pattern is used for signaling the OLT receiver to reset the FEC decoders, and prepare for the next incoming burst. The BE pattern was used in the initial implementations of PON burst-mode receivers (irrespective of the PON type), to give additional time to reset to the default state. Current implementations largely disregard the BE presence, and use input power presence as indication to reset to the default state. Note that the BE pattern is not FEC-protected, and has properties generally similar to the BS pattern.

5. Laser Off (410): The point where the ONU transmitter laser is being switched off.

Generally speaking, existing TDMA PON systems (whether specified in IEEE Std 802.3 or by ITU-T SG15Q2) have fixed Burst Preamble configuration. During the sync pattern portion of the Burst Preamble, as discussed supra, the ONU continuously transmits a pre-selected bit pattern (e.g., a sync pattern of 0xBF 40 18 E5 C5 49 BB 59, as defined in IEEE Std 802.3, subclause 76.3.2.5.2 for 10G-EPON), thereby providing the OLT receiver ability to perform the AGC (gain control/alignment) and CDR (clock recovery) functions. In some systems (e.g., 10G-EPON), the beginning of the data portion of the upstream burst and terminating with the Burst Preamble (area carrying actual customer data, with optical FEC protection), is designated with a specific bit pattern (so-called Start of Burst Delimiter (SBD) or Start-of-Burst (SOB), depending on the technology; e.g., 0x 6B F8 D8 12 D8 58 E4 AB, as defined in IEEE Std 802.3, subclause 76.3.2.5.2 for 10G-EPON). SBD is selected in a way that meets specific detection criteria; i.e., it features sufficient number of 0/1 bit level transitions, it has limited run length (number of consecutive 0s or 1s), and its Hamming distance from the background sync pattern is sufficiently large to guarantee proper detection even in the presence of bit errors in high Bit Error Ratio (BER) environment. See e.g., Hamming, R. W., "Error detecting and error correcting codes". *The Bell System Technical Journal,* 29 (2): 147-160 (April 1950), incorporated herein by reference in its entirety.

Herein lies a salient deficiency with, inter alia, extant PON systems; i.e., the synchronization (e.g., Burst Preamble) structure is fixed, effectively resulting in sub-optimum operation for all OLTs, irrespective of their burst-mode receiver implementation. Accordingly, several operational and implementation optimizations that are not addressed today are possible, but are precluded through the mandate of the fixed, "one size fits all" synchronization structures and protocols.

SUMMARY

The present disclosure addresses the foregoing needs by providing, inter alia, methods and apparatus for synchronizing and synchronization configuration within a network such as e.g., a passive optical network (PON).

In a first aspect of the disclosure, a method of operating a passive optical network (PON) is described. In one embodiment, the method includes: determining a plurality of synchronization parameters to be used during at least two different phases of synchronization between at least one service node and a controller node of the PON; and transmitting data indicative of the plurality of synchronization parameters to the at least one service node via at least one protocol data message, the at least one protocol data message configured to cause the at least one service node to utilize the plurality of synchronization parameters during subsequent discovery or synchronization process.

In one variant, the at least two different phases comprise: (i) a gain phase relating to signal power transmitted by the at least one service node onto the PON; and (ii) a clock signal recovery phase. In another variant, the at least two phases further include: (iii) a payload phase.

In one implementation, the payload phase comprises a phase during which FEC (forward error correction) protected payload data is transmitted, the payload phase delineated by at least two burst delimiter values.

In a further variant, the at least one service node comprises an ONU (optical network unit), and the controller node comprises an OLT (optical line terminal).

In another embodiment, the method of operating a passive optical network (PON) includes: determining at least two sets of synchronization parameters to be used during respective ones of at least two different modes of operation of at least one service node of the PON; and transmitting data indicative of the at least two sets of synchronization parameters to the at least one service node via at least one protocol data message, the at least one protocol data message configured to cause the at least one service node to utilize the at least two sets of synchronization parameters during respective ones of: (i) a discovery mode, and (ii) a normal or granting mode.

In yet another embodiment, the method of operating a passive optical network (PON) includes: determining a plurality of synchronization parameters to be used by at least one service node of the PON within a dynamically variable burst preamble; and transmitting data indicative of the plurality of synchronization parameters to the at least one service node via at least one protocol data message, the at least one protocol data message configured to cause the at least one service node to: configure applicable portions of the dynamically variable burst preamble according to respective ones of the plurality of synchronization parameters; and transmit the configured burst preamble to a controller node of the PON during a discovery or synchronization phase.

In another aspect of the disclosure, an OLT apparatus is disclosed. In one embodiment, the OLT apparatus includes an enhanced OLT (eOLT) configured to selectively apply synchronization protocols in order to optimize PON performance. In one variant, the synchronization protocols are signaled to the various eONU within the network via one or more control messages, and include one or more synchronization patterns for various phases of the synchronization and operation modes of the PON.

In another aspect of the disclosure, an ONU apparatus is disclosed. In one embodiment, the ONU apparatus includes an enhanced ONU (eONU) configured to selectively utilize synchronization protocols signaled by the cognizant eOLT in order to optimize PON performance.

In a further aspect of the disclosure, an optical network system is disclosed. In one embodiment, the system includes: (i) one or more eOLT apparatus, and (ii) one or more eONU apparatus in optical communication with at least one of the eOLT apparatus.

In a further aspect of the disclosure, a method of synchronization of components within a network is disclosed. In one embodiment, the network is an optical network using a TDMA-based protocol, and the method includes selectively using synchronization patterns and associated data that are particularly adapted to particular phases of operation of the system components.

In another embodiment, the network is an optical network using an OFDM-based protocol.

In yet another embodiment, the network is an (e.g., differentially signaled) electrical PHY network, such as one using a twisted pair cabling PHY.

In another aspect, a method of "reusing" allocated space within an existing protocol message is disclosed. In one embodiment, the method includes repurposing bit stuffing or other otherwise non-allocated bits or fields within the protocol message(s) to signal synchronization patterns and related data between an eOLT and one or more eONUs.

In a further aspect, a synchronization protocol is disclosed. In one embodiment, the protocol is adapted for use in a PON, and includes utilization of one or more control messages configured to cause one or more recipient entities (e.g., eONUs) to selectively implement one or more phase-specific synchronization patterns. In one variant, the protocol utilizes an IEEE Std 802.3-compliant structure.

In yet another aspect of the disclosure, a synchronization data and control message structure is disclosed. In one embodiment, the data and message structure comprises inclusion of a plurality of $SP_x$ (synchronization pattern) values and associated flags or another ancillary data relating thereto, transmitted as part of one or more control messages.

In a further aspect, a computer-readable apparatus is disclosed. In one embodiment, the apparatus includes a storage medium having at least one computer program disposed thereon in the form of a plurality of computer-executable instructions. In one variant, the apparatus is a hard disk drive (HDD). In another variant, the apparatus is a solid state device (SSD). In another variant, the apparatus comprises a program memory device.

In another aspect of the disclosure, computerized logic for implementing selective synchronization and operation protocols is disclosed. In one embodiment, the logic is embodied as software (e.g., one or more computer programs). In another embodiment, the logic is embodied as firmware. In another embodiment, the logic is embodied as part of a FPGA or other gate array. In yet another embodiment, the logic is embodied as part of an application-specific IC (ASIC).

These and other aspects shall become apparent when considered in light of the disclosure provided herein.

Figure 1:
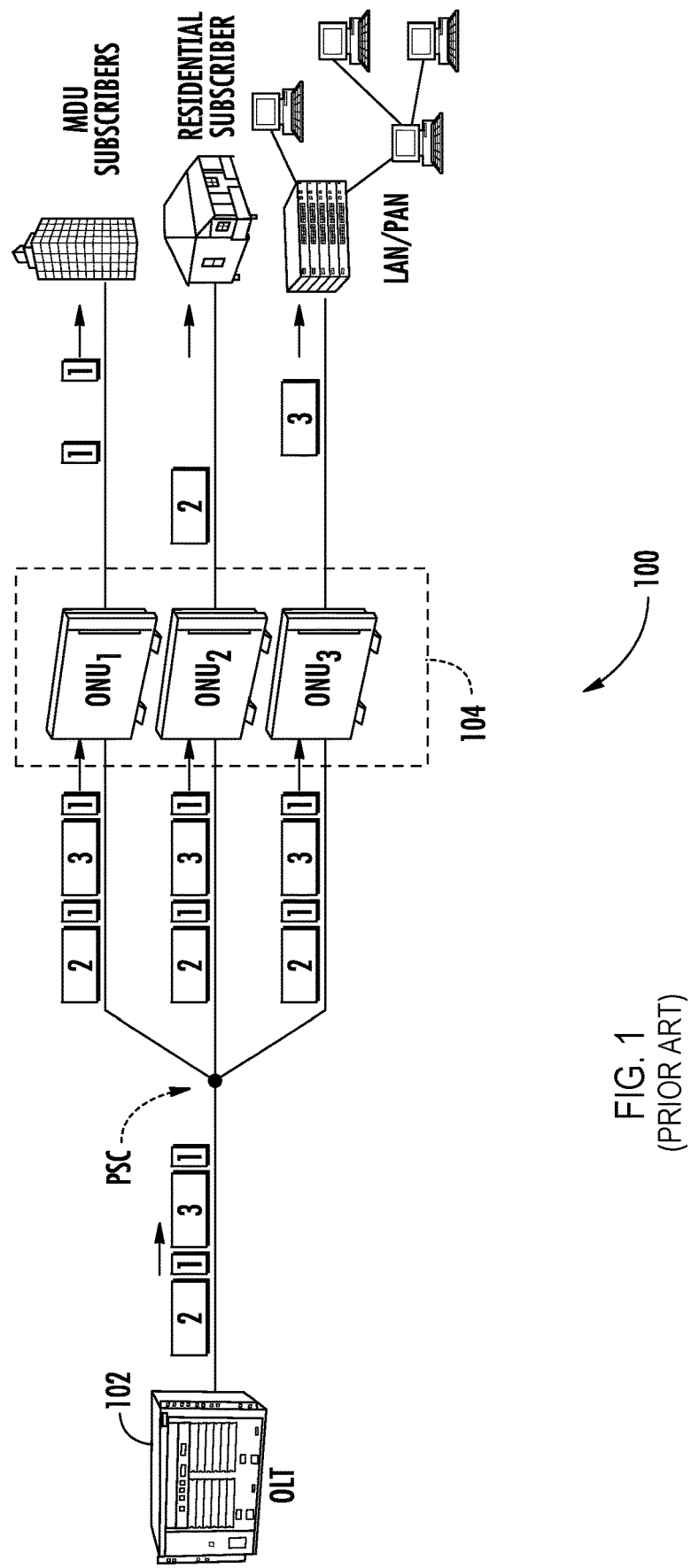
FIG. 1 is a block diagram illustrating an exemplary prior art downstream channel transmission process used in EPON applications.
Figure 2:
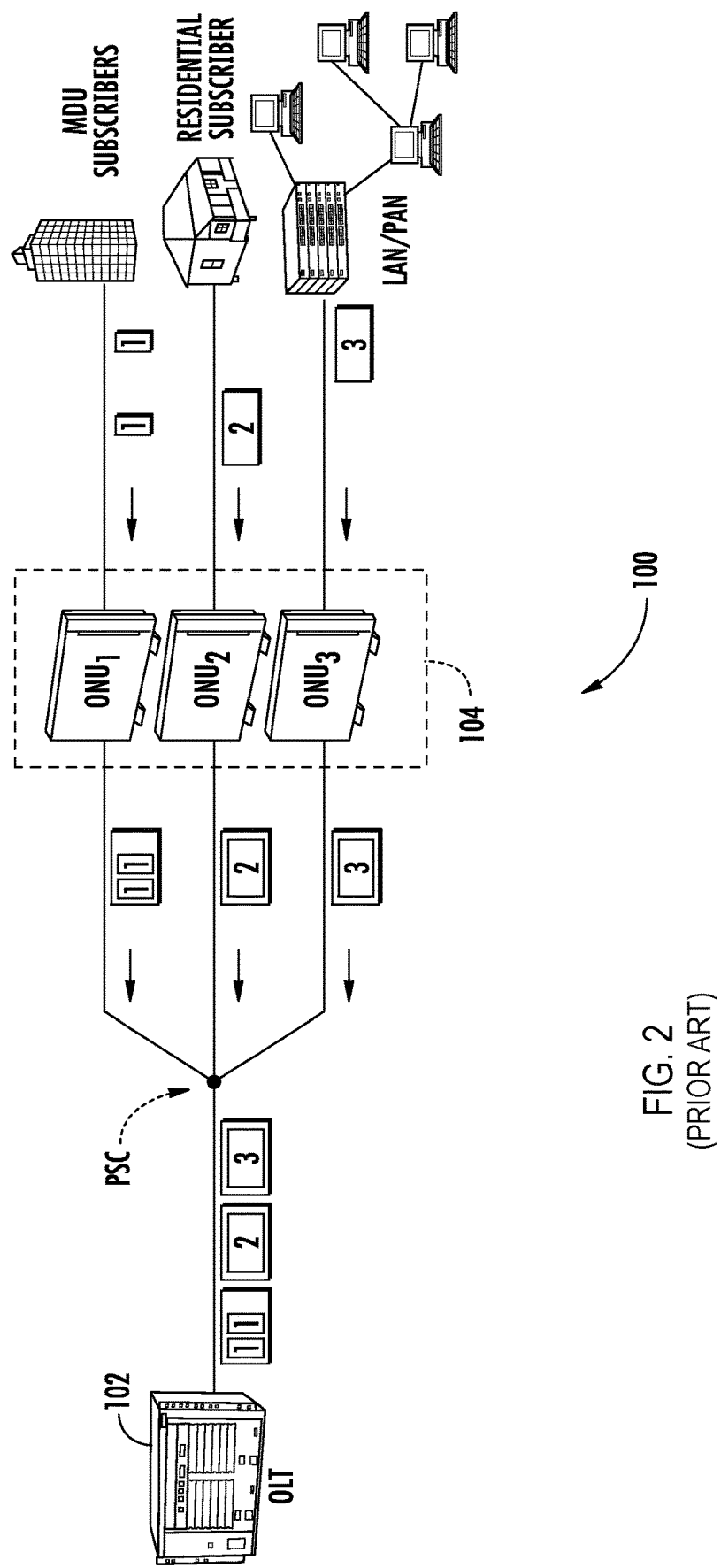
FIG. 2 is a block diagram illustrating an exemplary prior art upstream channel transmission process used in EPON applications.
Figure 3:
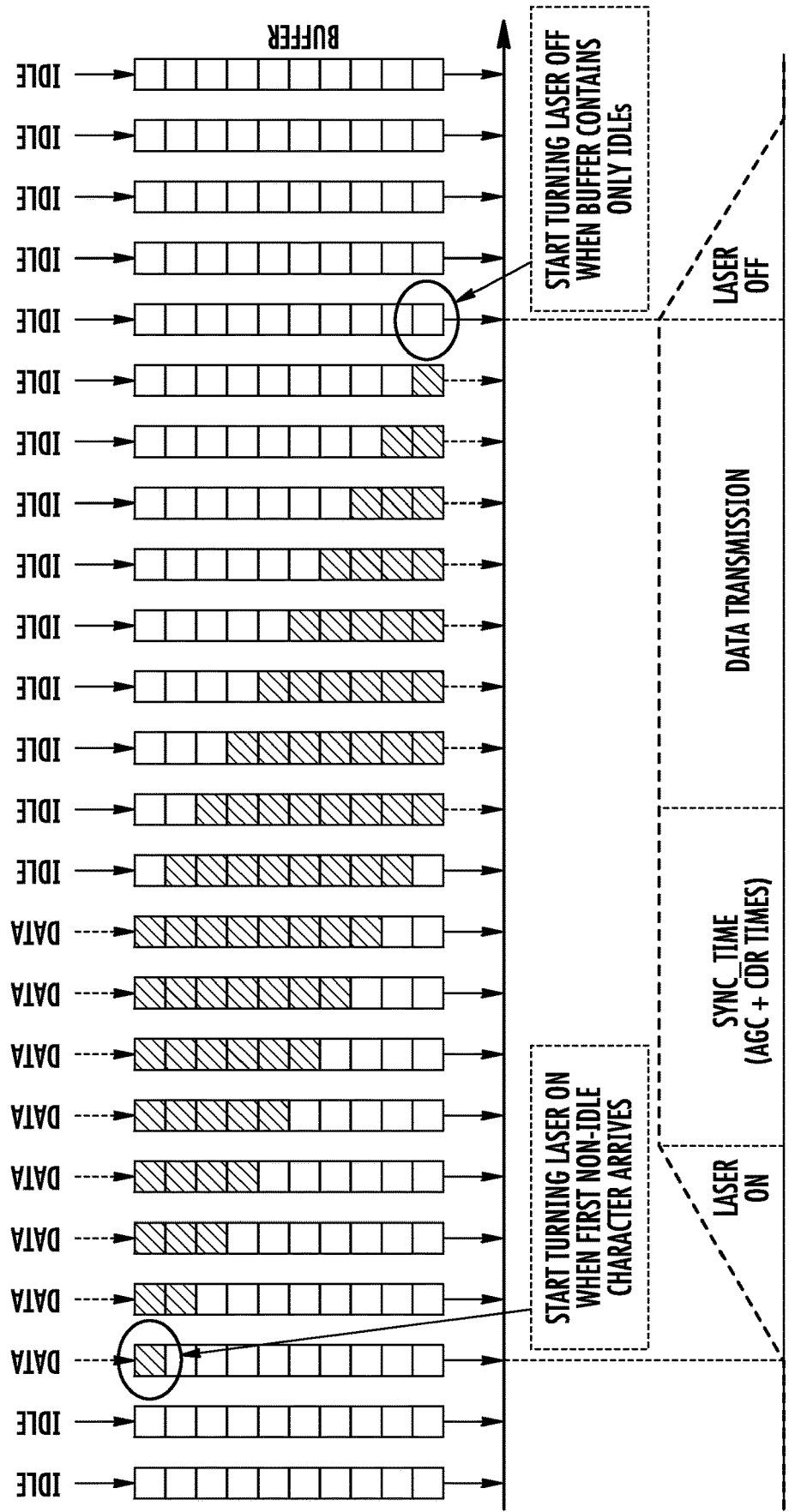
FIG. 3 is a graphical representation of an exemplary prior art data detector used in EPON applications.
Figure 4:
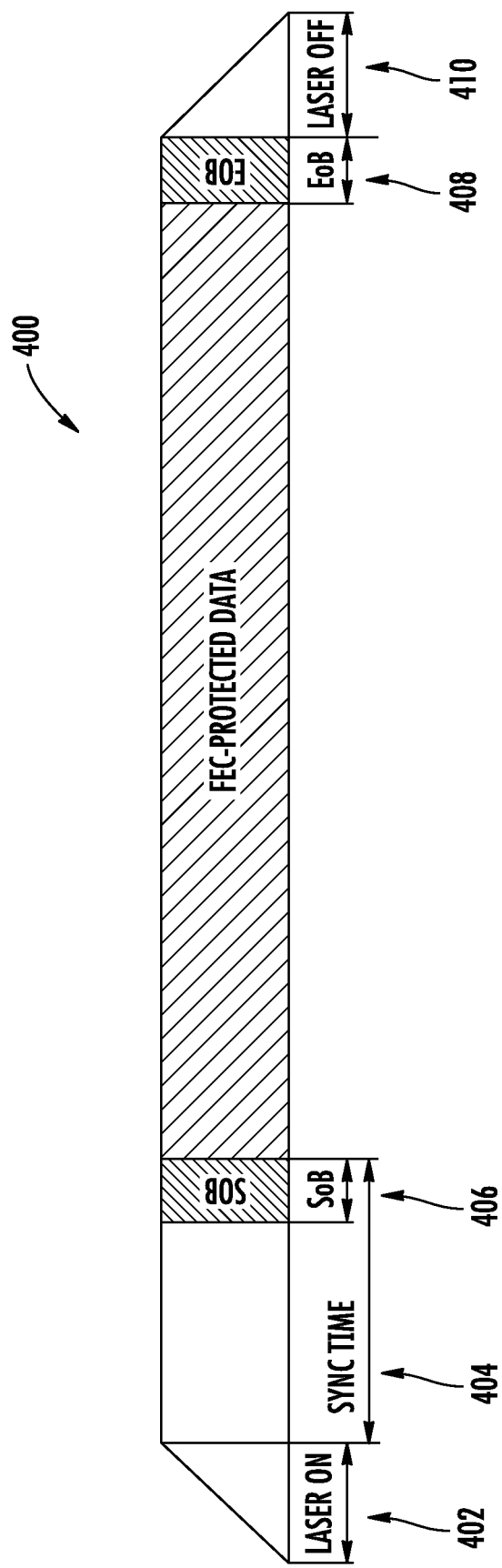
FIG. 4 is a graphical representation of an exemplary prior art upstream burst structure used in a 10G-EPON applications.

All figures © Copyright 2018 Charter Communications Operating, LLC. All rights reserved.

DETAILED DESCRIPTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "client device" includes, but is not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", and smartphones.

As used herein, the term "computer program" or "software" is meant to include any sequence or human or machine cognizable steps which perform a function. Such program may be rendered in virtually any programming language or environment including, for example, C/C++, Fortran, COBOL, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "Customer Premises Equipment (CPE)" refers without limitation to any type of electronic equipment located within a customer's or subscriber's premises and connected to or in communication with a network.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, GDDRx, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, optical networks (such as PONs), hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., optical fiber, wired/RF cable, RF wireless, millimeter wave, etc.) and/or communications or networking protocols (e.g., SONET, DOCSIS, IEEE Std 802.3, ATM, X.25, Frame Relay, 3GPP, 3GPP2, WAP, SIP, UDP, FTP, RTP/RTCP, TCP/IP, H.323, etc.).

As used herein, the term "network interface" refers to any signal or data interface with a component or network including, without limitation, those of the FireWire (e.g., FW400, FW800, etc.), Thunderbolt, USB (e.g., USB2.0, USB 3.0, etc.), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), Zigbee®, Z-wave, PAN (e.g., 802.15), power line carrier (PLC), or IrDA families.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, SSDs, DVR devices, flash drives, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation, any of the variants of IEEE-Std 802.11 or related standards including 802.11 a/b/g/n/s/v/ac or 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A, analog cellular, CDPD, satellite systems, millimeter wave or microwave systems, acoustic, and infrared (i.e., IrDA).

Overview

As previously noted, current synchronization operations in e.g., PONs are not optimized in a variety of aspects, including notably use of common synchronizing patterns for various phases of synchronization, and various types of operation of ONUs/OLTs.

In contrast, the inventors of the present disclosure have conceptually recognized that, in certain e.g., OLT receiver implementations, it would be beneficial for the AGC and CDR periods to have different bit patterns, for instance where one pattern is optimized for a first parameter or consideration (such as quick gain control adjustment), and another one optimized for a second parameter or consideration (e.g., quick clock recovery). In the exemplary case of the OLT burst mode receiver, during the AGC period, the receiver is ideally provided as many "1s" as possible, to reliably measure the power of the incoming signal. Conversely, during the CDR period, the OLT burst mode receiver is ideally provided with as many data value transitions (e.g., between 0 and 1) as possible to reliably detect and align to the phase of the incoming signal. As such, the requirements for AGC and CDR periods are contradictory, and cannot be optimized with a single bit pattern.

When AGC and CDR bit patterns are optimized for performance, the SBD pattern must still meet the detection requirements criteria for both the AGC and CDR patterns.

Additionally, in certain implementations, different AGC, CDR, and SBD patterns may be utilized during the discovery (e.g., ONU detection and registration) versus the normal operation modes, again optimizing the resulting system performance. Specifically, during the discovery operation, the OLT does not have any information (or has incomplete information) about the newly registering ONU, and may require longer, more bit-error tolerant AGC, CDR, and/or SBD patterns, to facilitate quicker and more reliable ONU discovery. During the normal operation, once the ONU capabilities and transmission profile are known to the OLT, the AGC period duration can be minimized (the OLT already knows with reasonable approximation at what power level the ONU is transmitting). Similarly, during such normal operation, the CDR period can be shortened.

Accordingly, exemplary embodiments of the enhanced OLT (eOLT) and (enhanced ONU (eONU) described herein allow for variation of the bit pattern in e.g., the specific Burst Preamble periods, to optimize eOLT detection and reception (in addition to or alternatively with the use of modified length) capability. The eOLT can optionally announce different bit patterns for specific operation modes (including different bit pattern value as well as their duration), advantageously allowing for further optimization of burst detection, as well as increases in upstream transmission efficiency.

Detailed Description of Exemplary Embodiments

Exemplary embodiments of the apparatus and methods of the present disclosure are now described in detail. While these exemplary embodiments are described primarily in the context of an optical network (e.g., PON) architecture having a network operator, digital networking capability, IP delivery capability, and a plurality of premises client devices/CPE, the general principles and advantages of the disclosure may be extended to other types of networks and architectures that are configured to deliver digital e.g., media data (e.g., text, video, and/or audio) or other data. Such other networks or architectures may be broadband, narrowband, wired, or otherwise, the following therefore being merely exemplary in nature.

It will also be appreciated that while various embodiments or aspects discussed herein are described in the context of next generation EPON system (referred to herein as "NG-EPON") currently under development in the IEEE P802.3ca project, the various features and functionalities described can be readily adapted by those of ordinary skill, when given this disclosure, to any type of PON system, defined by any standard development organization, vendor, etc., and in fact other types of PHYs and/or modulation schemes as referenced elsewhere herein.

Moreover, the disclosed aspects and functionality are in no way limited to PON systems; other types of PHY including for example wired systems (e.g., twisted pair systems utilizing differential signaling) may also benefit from the various aspects disclosed herein.

It will further be appreciated that while described generally in the context of a network providing FTTx distribution services to users or subscribers of the commercial PON-based network referenced above for e.g., Internet data or backhaul services, the present disclosure may be readily adapted to other types of environments including, e.g., commercial/enterprise, and government/military applications, and/or other types of internetworks. Myriad other applications are possible.

While the terms "downstream" and "upstream" and "ingress" and "egress" are used with reference to the various functions of the nodes described herein, it should be appreciated that such usage is provided solely for clarity, and is not in any way determinative or dispositive of a location or other attribute of a component, system or process. In fact, it is readily appreciated that typical nodes, applications, and/or transactions are bidirectional in nature, and thus nodes may possess both downstream/upstream and/or ingress/egress capabilities.

Lastly, it is noted that while a certain scheme or model (e.g., OSI model, Layers 1, 2, 3, etc.) for network layering or construction are referenced herein, the various aspects of the disclosure are in no way limited to such descriptions, models or schemes.

Other features and advantages of the present disclosure will immediately be recognized by persons of ordinary skill in the art with reference to the attached drawings and detailed description of exemplary embodiments as given below.

Service Provider Network—

Figure 5:
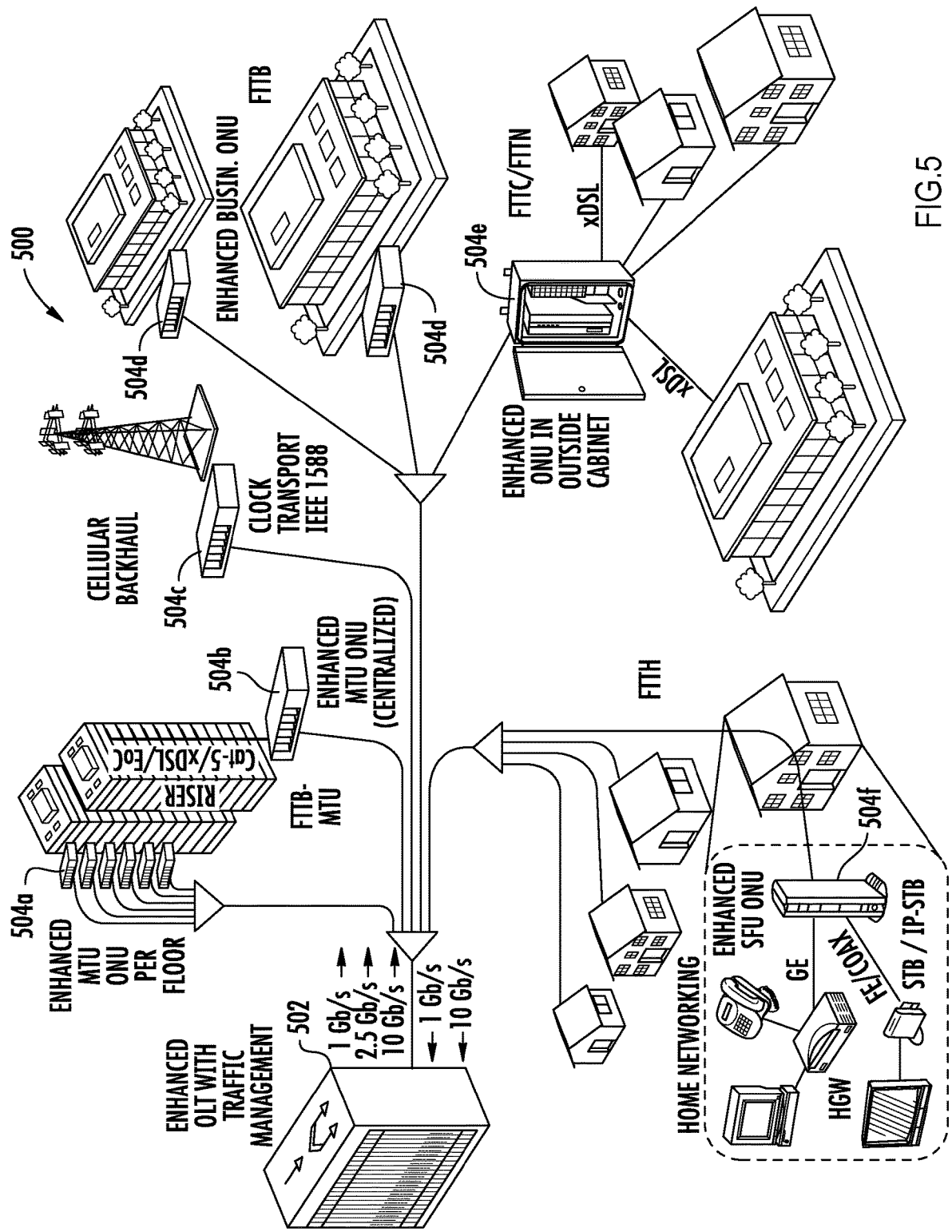
FIG. 5 is a block diagram illustrating an exemplary PON deployment with enhanced ONU (eOLT) and enhanced ONU(s) (eONU(s)), including various types of applications and service domains.

FIG. 5 illustrates an exemplary deployment architecture 500 for the various optimization-capable entities described subsequently herein (i.e., OLT, ONU, and network logic servers or processes), including various use cases/scenarios. As shown in FIG. 5, the architecture comprises an eOLT 502 which is optically coupled with a number of eONUs 504a-504f used with various types of premises and/or applications, including for MTU (multi-tenant unit) delivery 504a, 504b, cellular base station backhaul 504c, enterprise or business services delivery 504d, consumer (e.g., home or apartment) service provision 504f, etc. As indicated, various "last mile" portions or technologies may be used, including FTTH (fiber to the home), FTTC/FTTN (fiber to the curb/node), FTTB (fiber to the building), as well as the illustrated MTU delivery configurations.

As described in greater detail below with respect to FIGS. 6-10, the enhanced OLTs 502 and enhanced ONUs 504a-504f of the exemplary illustrated embodiment include functionality to enable optimization of the timing and/or power synchronization processes. It will be appreciated that while the architecture 500 of FIG. 5 is illustrated as having all eONUs 504 (as opposed to unenhanced or prior art ONUs, not shown), the architecture 500 can be configured to accommodate a heterogeneous mix of eONUs and ONUs, such as during a "phased" introduction or deployment of the eONUs. In one such configuration, the protocols (described in detail below) used by the eOLT 502 may simply be duplicated; i.e., the eOLT can be configured to use both prior art protocols for interaction with the ONUs, and the enhanced protocols described herein for communication with the eONUs 504, including in staggered, time-divided, frequency/wavelength-divided, or other multiple access schemes, whether during the discovery phase or otherwise.

Synchronization Protocol—

Exemplary implementations of the synchronization protocols of the disclosure are now described in detail. It is noted that the following high-level protocol description is described in a PON-version independent manner; i.e., is not specific to particular EPON or GPON protocols, messages, etc. Implementation examples for NG-EPON, using EPON-specific protocols, message definitions, etc. are provided subsequently herein.

Generally speaking, the disclosed exemplary embodiments of the synchronization protocol (as applied to PONs) provide one or more of the following functionalities, depending on the particular implementation:

(i) The ability to announce a selected or proposed AGC pattern, optimized for the given OLT burst-mode receiver implementation, to at least one of the connected ONUs. Several related scenarios are possible, including for example (a) use of a broadcast announcement to all connected ONUs; (b) multicast announcement to a selected group or subset of connected ONUs; and (c) unicast announcement to one ONU (or one ONU at a time, according to a sequence or prescribed order).

(ii) The ability to announce a selected or proposed CDR pattern, optimized for the given OLT burst-mode receiver implementation, to at least one of the connected ONUs. Several related scenarios are possible, including for example (a) use of a broadcast announcement to all connected ONUs; (b) multicast announcement to a selected group or subset of connected ONUs; and (c) unicast announcement to one ONU (or one ONU at a time, according to a sequence or prescribed order).

(iii) The ability to announce a selected or proposed SBD pattern, optimized for the given OLT burst-mode receiver implementation, to at least one of the connected ONUs. Several related scenarios are possible, including for example (a) use of a broadcast announcement to all connected ONUs; (b) multicast announcement to a selected group or subset of connected ONUs; and (c) unicast announcement to one ONU (or one ONU at a time, according to a sequence or prescribed order).

(iv) The ability to announce a selected or proposed EBD (end of burst) pattern, optimized for the given OLT burst-mode receiver implementation, to at least one of the connected ONUs. Several related scenarios are possible, including for example (a) use of a broadcast announcement to all connected ONUs; (b) multicast announcement to a selected group or subset of connected ONUs; and (c) unicast announcement to one ONU (or one ONU at a time, according to a sequence or prescribed order).

(v) The ability to announce selected or proposed different AGC, CDR, SBD and/or EBD pattern values for the discovery operation (when individual ONUs are discovered and first registered) and normal granting operation (when individual ONUs have been already registered and are polled periodically for transmission of queued used data). Several related scenarios are possible, including for example (a) use of a broadcast announcement to all connected ONUs; (b) multicast announcement to a selected group or subset of connected ONUs; and (c) unicast announcement to one ONU (or one ONU at a time, according to a sequence or prescribed order).

(vi) The ability to announce selected or proposed durations of AGC, CDR, SBD and/or EBD pattern values for the discovery operation (when individual ONUs are discovered and first registered) and normal granting operation (when individual ONUs have been already registered and are polled periodically for transmission of queued used data). Several related scenarios are possible, including for example (a) use of a broadcast announcement to all connected ONUs; (b) multicast announcement to a selected group or subset of connected ONUs; and (c) unicast announcement to one ONU (or one ONU at a time, according to a sequence or prescribed order).

(vii) The ability to combine AGC and CDR periods, as needed, into a single pattern announcement, through the announcement of the same pattern during the AGC and CDR announcement, or alternatively—through the use of two announcement (one for AGC and CDR, and one for SBD), or alternatively three discrete announcement messages (one for AGC, one for CDR, and one for SBD).

Figure 6:
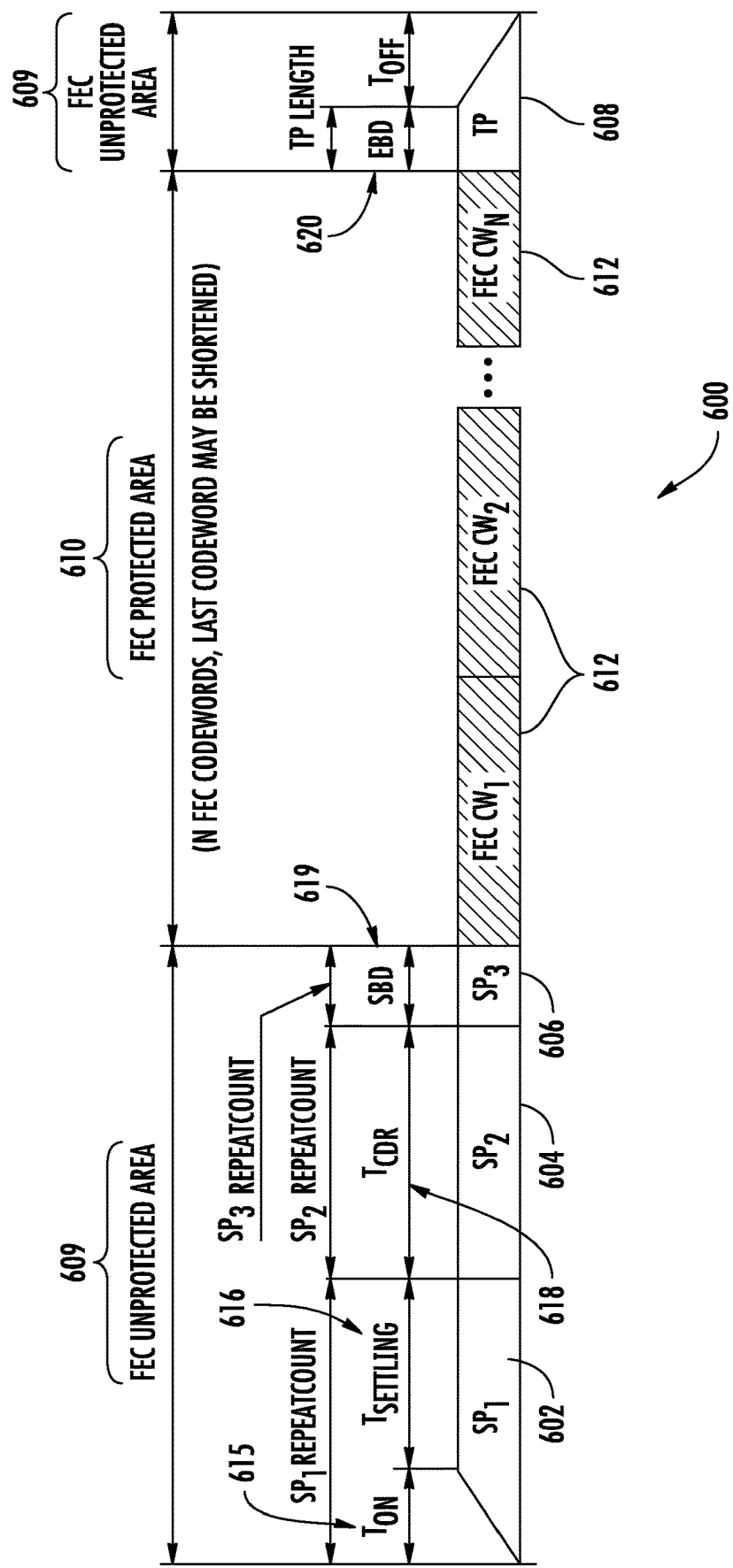
FIG. 6 is a graphical representation of an exemplary embodiment of an upstream burst structure according to the present disclosure.

FIG. 6 illustrates one embodiment of an upstream burst structure according to the present disclosure. As previously noted, in the exemplary case of an eOLT burst mode receiver, during the AGC period, the receiver is ideally provided as many data "1s" as possible, to reliably measure the power of the incoming signal (i.e., transmitted from the eONU). Conversely, during the CDR period, the eOLT burst mode receiver is ideally provided with as many data value transitions (e.g., between 0 and 1) as possible to reliably detect and align to the phase of the incoming signal. As such, the requirements for AGC and CDR periods are contradictory, and cannot be optimized with a single bit pattern.

Moreover, patterns for periods of discovery of e.g., unregistered eONUs by the eOLT may not be optimized for periods of normal (granting) operation; i.e., when the ONU has been registered and subsequently wants to transmit data upstream to the OLT during is assigned TDMA slot (or OFDM time/frequency resource block, as discussed in greater detail elsewhere herein).

Accordingly the exemplary structure of FIG. 6 advantageously addresses these issues by, inter alia, enabling the burst preamble used by the enhanced ONU (eONU) to be dynamically varied as a function of one or more parameters; e.g., time and/or operational mode. Specifically, the burst structure 600 of FIG. 6 explicitly defines four areas (portions) of the upstream burst; i.e., $SP_1$ 602, $SP_2$ 604, $SP_3$ 606, and TP 608. In one variant, the size of each upstream burst area is expressed as integer multiples of a prescribed primary data block size (i.e., 2×N, 3×N, etc., where N=the prescribed block size). For example, in the case of NG-EPON defined under the incipient IEEE P802.3ca project standard, the data block size would be equal to 257-bits, resulting from the 256b/257b line code selected for the use in this particular system. In other systems, the data block size might be different, depending on any number of factors including the line code used (e.g., 8B10B vs. 256b/257b).

The above-referenced four separate regions 602, 604, 606, 608 of the FEC unprotected area 609 of the upstream burst structure 600 include: (1) Sync Pattern $SP_1$ period 602, covering the laser on ($T_{on}$) zone 615 and gain control adjustment ($T_{rsettling}$) zone 616; (2) Sync Pattern $SP_2$ period 604, covering the clock recovery period ($T_{CDR}$) zone 618; (3) Sync Pattern $SP_3$ period 606, covering the start of burst delimiter (SBD) 619; and (4) Terminating Pattern TP period 608, covering the end of burst delimiter (EBD) 620.

The FEC protected area 610 includes in the illustrated embodiment a plurality of FEC (forward error correction) codewords 612, although other configurations may be utilized consistent with the disclosed protocol.

The values as well as durations for $SP_1$, $SP_2$, $SP_3$, and/or TP periods are announced in one embodiment by the eOLT 502 to at least one of the connected eONUs 504. As noted supra, several scenarios are possible, including for instance broadcast announced to all eONUs, multicast announcement to a selected group of connected eONUs, and unicast announcement to one eONU at a time. The broadcast announcement is typically used for example when targeting all eONUs during the discovery process. The unicast announcement is typically used for example when targeting one specific eONU requiring a change of any of the $SP_1$, $SP_2$, $SP_3$, and/or TP parameters. Finally, the multicast announcement is typically used for example when targeting a specific group of connected eONUs (for example, all eONUs from a specific manufacturer, all eONUs that are at a specific distance from the OLT, all eONUs within a prescribed portion of the fiber architecture 500, all eONUs within a prescribed range of network addresses, etc.).

During the discovery operation, the eOLT 502 broadcasts the values of $SP_1$, $SP_2$, $SP_3$, and/or TP patterns 602, 604, 606, 608 to all unregistered eONUs, using specific control messages (referred hereinafter to as SP_VALUE). The structure, size, and bit encoding of SP_VALUE messages are PON-system specific, but the SP_VALUE generally includes at least the following information:

(i) A Pattern Identifier or PI ($SP_1$, $SP_2$, $SP_3$, TP), expressed in one implementation in the form of an explicit identifier (alphanumeric) or index in a message sequence.

(ii) An expected number of messages in the sequence (EN), with a plurality of possible values (discussed below in greater detail). When a message with an unexpected number of messages in the sequence is received, the eONU implements a prescribed error or remediation action; e.g., it ignores such SP_VALUE and information contained therein.

In one variant, the expected number of messages parameter is set to 2, and the TP 608 is not announced, the $SP_1$ 602 and $SP_2$ 604 are combined into a single Burst Preamble zone and announced using a single message (first of the two messages), and $SP_3$ 606 is announced separately (second of the two messages).

In another variant, the expected number is set to 3, and the TP 608 is not announced, with $SP_1$ 602, $SP_2$ 604, and $SP_3$ 606 being all announced separately via three (3) respective messages.

In another variant, the expected number is set to 3, and the TP 608 is announced (first message), $SP_1$ 602 and $SP_2$ 604 are combined into a single Burst Preamble zone and announced using a single (second) message, and $SP_3$ 606 is announced separately (third message).

Lastly, in a further variant, the expected number is set to 4, and the TP 602, $SP_1$ 604, $SP_2$ 606, and $SP_3$ 608 are all announced separately via four respective messages.

(iii) A Pattern Value (PV), comprising an actual bit pattern value for the given Burst Preamble zone carried in the given SP_VALUE message.

(iv) A Balanced Flag (BF), used for signaling desired $SP_x$ value(s), where x=1, 2 . . . n. For instance, in one variant, if BF is set (true), rather than repeating SPx+SPx . . . SPx N times, the receiving eONU 504 alternates SPx and its inverted value ($!SP_x$) N times; i.e., transmit the following sequence: SPx+!SPx+SPx+ . . . +!SPx. If reset (false), the receiving eONU transmits a simple sequence of SP values, such as the following: SPx+SPx+SPx+ . . . +SPx.

(v) A Reversed Flag (RF), used in conjunction with the BF for signaling desired SPx value(s). In one variant, if the RF is set (true), rather than repeating SPx+SPx . . . SPx N times, the receiving eONU alternates SPx and its reversed value (~SPx) N times; i.e., transmit the following sequence SPx+ ~SPx+SPx+ . . . +~SPx. If reset (false), the eONU transmits a simple sequence of SP values, such as the following: SPx+SPx+SPx+ . . . +SPx. The Balanced Flag and Reversed Flag are mutually exclusive; i.e., when the Balanced Flag is set, the Reversed Flag shall be reset, and vice versa.

Note that depending on the size of available control messages in the given PON system in which the protocol is being utilized, the SP_VALUE may be encoded into a single message carrying all target values of $SP_1$, $SP_2$, $SP_3$, and/or TP patterns 602, 604, 606, 608, together with the associated set (AS) of data. In one variant, the AS includes the following information: (1) the pattern identifier (PI), (2) the expected number (EN), (3) the balanced flag (BF), and (4) the reversed flag (RF), where each value of $SP_1$, $SP_2$, $SP_3$, and/or TP patterns includes this associated information set.

Alternatively, the SP_VALUE may be encoded into a number of messages, where each message carries only one value of $SP_1$, $SP_2$, $SP_3$, and/or TP patterns 602, 604, 606, 608, together with the associated set (AS).

It will be appreciated that based on the particular implementation (including protocol limitations associated therewith), various combinations of the foregoing can be used consistent with the present disclosure. For example, as noted above, a single message with four patterns, plus associated set, can be utilized. Alternatively, each of the patterns can have their own associated set or sets. In the exemplary case of EPON for instance, a control message is 64B wide, and can support just one pattern and one set of control flags therein. Hence, each $SP_x$ value requires a separate message. In other implementations, a single control message may carry all $SP_x$ values and associated flags (whether the associated flags are applicable to all $SP_x$ values or only individual ones thereof), provided that enough space is available. Yet other combinations will be appreciated by those of ordinary skill given the present disclosure, consistent with the particular limitations of the prevailing protocol(s).

Apart from the target values of $SP_1$, $SP_2$, $SP_3$, and/or TP patterns, the eOLT 502 also notifies at least one connected eONU of the duration of the given pattern to be used during the prescribed operations or modes of interest. These duration values associated with each pattern are vendor-specific, and depend on the particular eOLT burst-mode receiver implementation. For example, in one variant, the operations/modes include: (i) the discovery operation, and (ii) normal (granting) operation. In one implementation, the duration of the given pattern is expressed in multiples of the pattern size (data block). For example, in NG-EPON the data block is equal to 257 bits, and hence the duration of each pattern is expressed in integer multiples of 257 bits (i.e., 257 bits, 514 bits, 771 bits, etc.). Similar logic applies to other line codes (e.g., 8B/10Bm 64B/66B, etc.).

In one embodiment, the eOLT 502 announces the aforementioned target pattern durations using a single SP_DURATION message, the latter containing target pattern durations for each pattern for both (i) the discovery operation, and (ii) the normal (granting) operation. Other operations/modes can be added; e.g., a "test" mode or the like, such additional operation/mode being serviced by the same message (with additional pattern duration values applicable to the added operation/mode in one embodiment).

Alternatively, the eOLT may announce target pattern durations using more than one message; i.e., one for each operation/mode being configured. For example, in one scenario, two (2) SP_DURATION messages are used, one carrying only target pattern durations for each pattern for the above-described discovery operation (mode) only, and a second one carrying target pattern durations for each pattern for the normal (granting) operation/mode only. Other operations/modes can be added; e.g., the aforementioned "test" mode or the like, such additional operation/mode being serviced by a separate message in one embodiment.

Moreover, in other embodiments, all or portions of the SP_DURATION data may be carried in dedicated control messages, or added into one or more existing control messages provided that sufficient space within the message is available.

In operation, the eONU 504 keeps track of the individual announced pattern values and their respective durations, as announced by the eOLT 502. For instance, in one variant, the eONU assembles a data structure (e.g., table, relational database file, etc.) which correlates these values and enables access thereto by the eONU logic 1011 (see FIG. 10). In one embodiment, the eONU is configured such that, without a complete set of the pattern values and their respective durations, the eONU will not attempt registration; i.e., the eONU 504 ignores all opportunities for registration until a complete set of pattern values and their respective durations is received from the eOLT, such as via the SP_VALUE and SP_DURATION messages discussed above.

Moreover, in one variant, the eONU logic is configured such that once registration has been successfully completed, the eONU 504 ignores all subsequent SP_VALUE and SP_DURATION messages associated with the discovery operation (mode), but receives and processes all SP_VALUE and SP_DURATION messages associated with the normal (granting) operation or mode. This logic allows the eOLT 502 to, inter alia, modify data such as the pattern values and/or their duration, for a specific eONU in a targeted fashion. This functionality advantageously provides an opportunity to further optimize the eONU burst structure, and reception of the upstream data burst generated by the given eONU.

In one embodiment, the eONU 504 is further configured to purge all stored pattern values and their respective durations on local and/or remote deregistration. Additionally, the eONU is configured to discard any received SP_VALUE and SP_DURATION messages containing invalid pattern indices; e.g., when only 3 pattern values are expected, but the OLT announced pattern number is 5. This prevents the eONU from storing and acting on invalid information received from the eOLT 502. In one variant, the eONU is restricted to performance of validation of pattern values and their respective durations, as received from the eOLT, according to the foregoing logic. This in effect means that the eONU puts explicit "trust" in the values announced by the eOLT, as long as the received data set is complete. In the exemplary system architecture, the eOLT 502 is the only device with visibility into the complete PON 500, all connected eONUs 504, signal quality, and further has sufficient information to make decisions on any adjustments to the pattern values and/or their respective durations for particular eONUs 504.

Methods—

Figure 7:
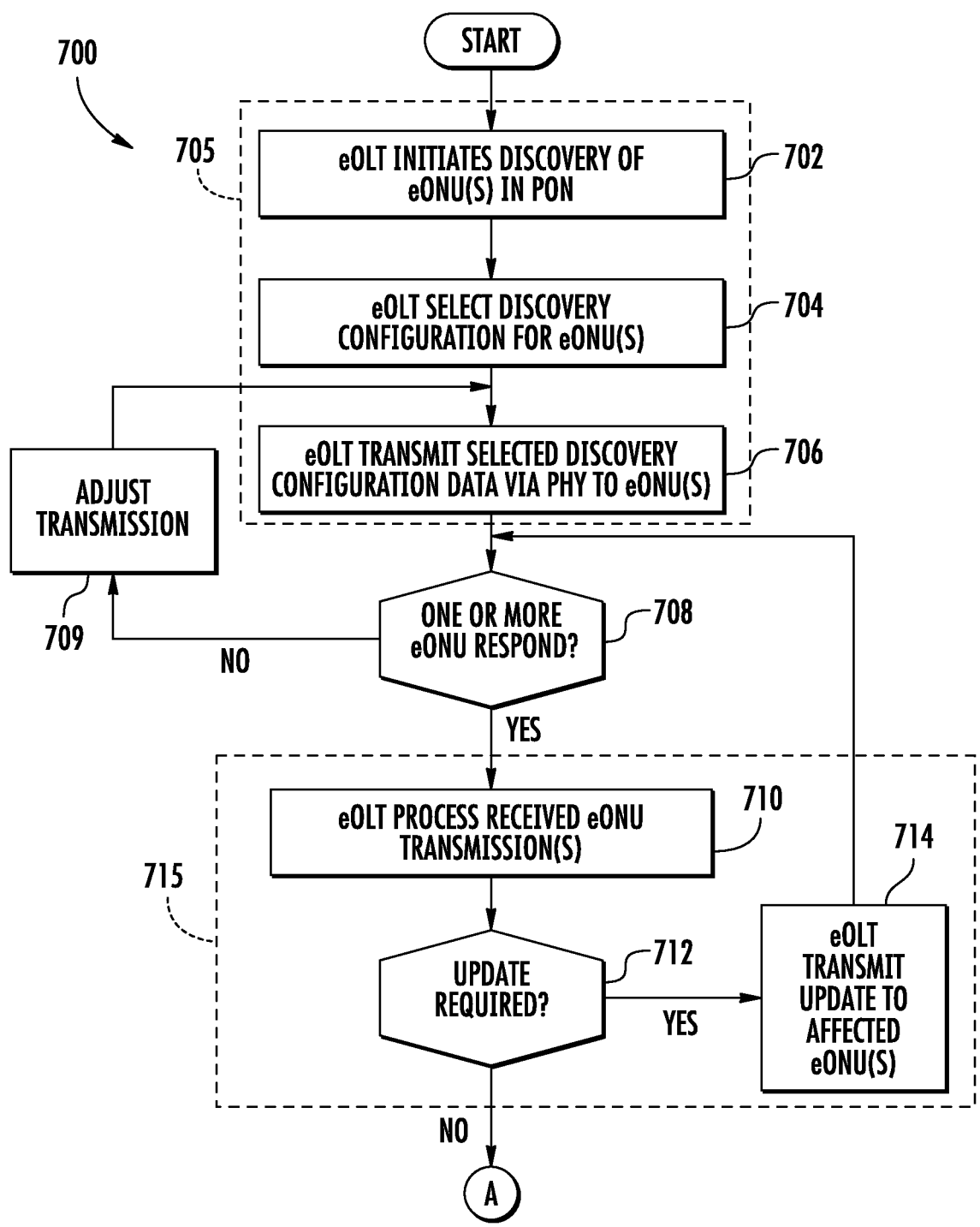
FIG. 7 is a logical flow diagram illustrating one embodiment of a generalized method for eONU discovery and synchronization by an eOLT within a PON, according to the disclosure.
Figure 7:
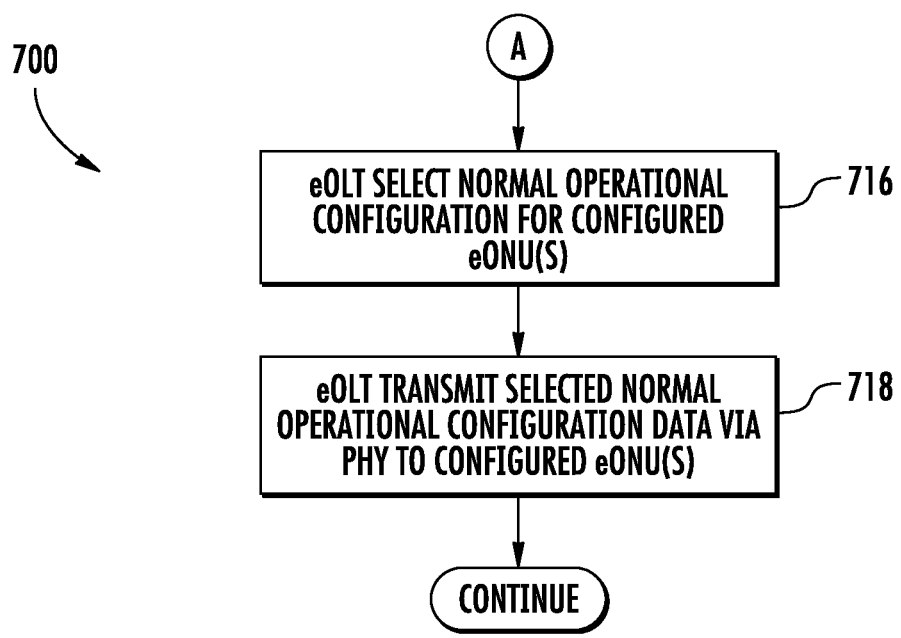

FIG. 7 illustrates one embodiment of a generalized method for eONU discovery and synchronization by an eOLT within a PON, according to the disclosure.

As shown, the method 700 begins with the eOLT initiating discovery of the one or more eONUs (step 702). This initiation may be for example as a result of an eOLT startup or reboot, system configuration changes (e.g., addition of nodes or eONUs, etc.), periodic refresh, or in response to an operator command or recovery from an error event.

Next, at step 704, the eOLT selects the discovery mode configuration for the eONUs. As described in greater detail below, this may include for example selection of the $SP_1$-$SP_3$ and TP parameters, as well as duration(s) applicable thereto and the associated data such as BF, RF, etc. This selection may be "blind" (i.e., where the eOLT has no a priori knowledge regarding the eONU configuration, laser, etc., such as for unregistered eONUs), or based on prior data obtained by the eOLT regarding the (given) eONU (e.g., previously registered). As such, the eOLT may simply select a default set of parameters to communicate to the eONUs, with the default being selected for example to optimize synchronization across a plurality of possible eONU types and configurations.

At step 706, the eOLT transmits the data relating to the selected parameters to the relevant eONUs via an interposed PHY. As previously indicated, the transmission may be in the form of a broadcast (such that all eONUs on the PON receive the data), or multicast (subset of eONUs), or one or more unicasts (to one or more particular eONUs only) according to the underlying communication protocol used (see also FIG. 7a, discussed below). For instance, the communication protocol may comprise an IEEE Std 802.3-based protocol (Ethernet), and the PHY may comprise any available PHY suitable for transmitting the messages and to which the target eONUs have access, such as e.g., the optical PHY itself, wired CAT-5/6, wireless interface, etc. The aforementioned PON-specific control messages (e.g., SP_VALUE and SP_DURATION) are be used as the basis for these messages in one embodiment.

At step 708, the eOLT determines whether the target eONUs have responded to the transmitted (control) messages. In one simple model, an ACK or other protocol mechanism is used to confirm message receipt via the control channel, e.g. Multi Point Control Protocol (MPCP) in the case of Ethernet PON. Alternatively (or in conjunction with the foregoing) reception of optical domain synchronization signals generated by the eONU(s); i.e., the eONU turning its laser on and initiating the PON synchronization protocol, can be used as the basis of determining reception of the transmitted messages. In the case where the optical synchronization signals are used as a basis for determining reception, and no optical signal is present from the target eONUs, several scenarios are possible; i.e., the target eONU(s) (i) may not have received the transmission for whatever reason (wrong address, transmission medium errors, etc.), or (ii) did receive the data, but the data is incomplete or cannot otherwise be validated or utilized (e.g., the expected number or EN is not the same as the number actually received). In such cases, the eOLT will "adjust" the data transmission (step 709) whether by re-transmitting the data/messages as originally sent, utilizing another protocol or PHY to communicate with the eOLT, changing the number or format of protocol messages used (e.g., selecting another of the 2, 3, or 4 message (EN) SP_VALUE protocols discussed above), or otherwise.

It will also be appreciated that error messages issued by the receiving eONU, such as upon failure to validate the transmitted control messages, may be used at all or part of the basis of this step 708 logic. See the discussion of FIG. 8 below.

When the appropriate optical synchronization signals are present from the target eONUs (as configured by the data sent via the one or more messages) per step 708, the eOLT next processes the received eONU transmissions per step 710. In one embodiment, this processing includes utilization of the AGC, CDR, SBD, and EBD patterns dictated by the eOLT, so as to achieve the desired functions; i.e., gain adjustment, clock recovery, FEC codeword start/finish delineation, etc. Per step 712, if an update to one or more of the parameters is required (e.g., where the eOLT cannot conduct successful clock recovery based on the transmitted pattern), new or updated data is sent to the affected eONU(s) per step 714, and the synchronization re-attempted.

Assuming successful synchronization (and hence completion of the discovery mode), the eOLT then selects the normal (granting) operational configuration(s) for the target eONU(s) per step 716, and transmits these data to the target eONU(s) per step 718, such as via the aforementioned SP_VALUE and SP_DURATION messages particular to the operational mode. Note that the selected normal (granting) operational mode parameters, as discussed elsewhere herein, will typically be different than those selected for the discovery/synchronization mode, so as to optimize performance of the PON.

Moreover, it will be recognized that the selection of the normal operational mode parameters may occur contemporaneously with selection of discovery mode parameters (e.g., at step 704), or elsewhere during the method 700. For example, as discussed above, the discovery and operational mode parameters/duration values may be aggregated into one or more SP_VALUE and/or SP_DURATION control messages). In some variants, selection of the operational mode parameters is predicated or based at least partly on the discovery mode parameters selected. Yet further, the present disclosure contemplates that the processing of the received eONU optical transmissions at step 710 by the eOLT logic may include analysis that is used to inform the selection of the normal operational mode parameters; e.g., based on observed characteristics of the discovery signal transmissions from the eONU(s) as received by the eOLT receiver.

It will also be appreciated that the PHY used for transmission of the normal operational mode data messages may be a different one than that initially used to transmit the discovery mode data messages. For example, after successful synchronization, the eOLT and eONU are communicative via the optical domain, and hence data may be transmitted via the PON fiber.

Figure 7A:
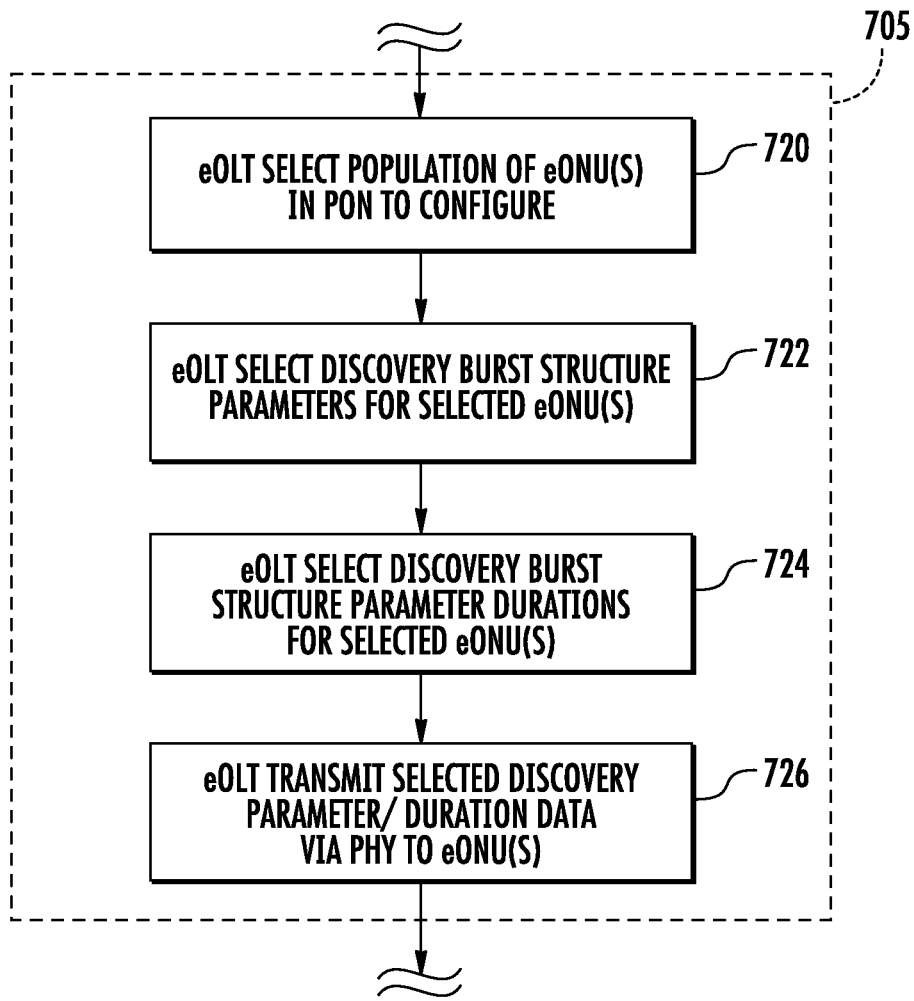
FIG. 7A is a logical flow diagram illustrating one implementation of the method of FIG. 7.

FIG. 7A illustrates one implementation of the method 700, particularly step 705 thereof. As shown, in the exemplary implementation, the eOLT first selects a desired target population of eONUs within the PON to configure per step 720. This selection may be based on for example knowledge of the PON configuration (e.g., via access to a database or data structure indicating eONU membership and network address for the PON).

Per step 722, the eOLT then selects the discovery mode burst structure parameters for the target eONU(s); i.e., $SP_1$-$SP_3$, and TP. Per step 724, the corresponding durations (e.g., integer multiples of the line code) are selected for use with the various burst parameters as previously described.

Lastly, per step 726, the eOLT transmits the selected parameters and duration values to the target eONU(s) via one or more protocol (e.g., control) messages, as described elsewhere herein.

Figure 7B:
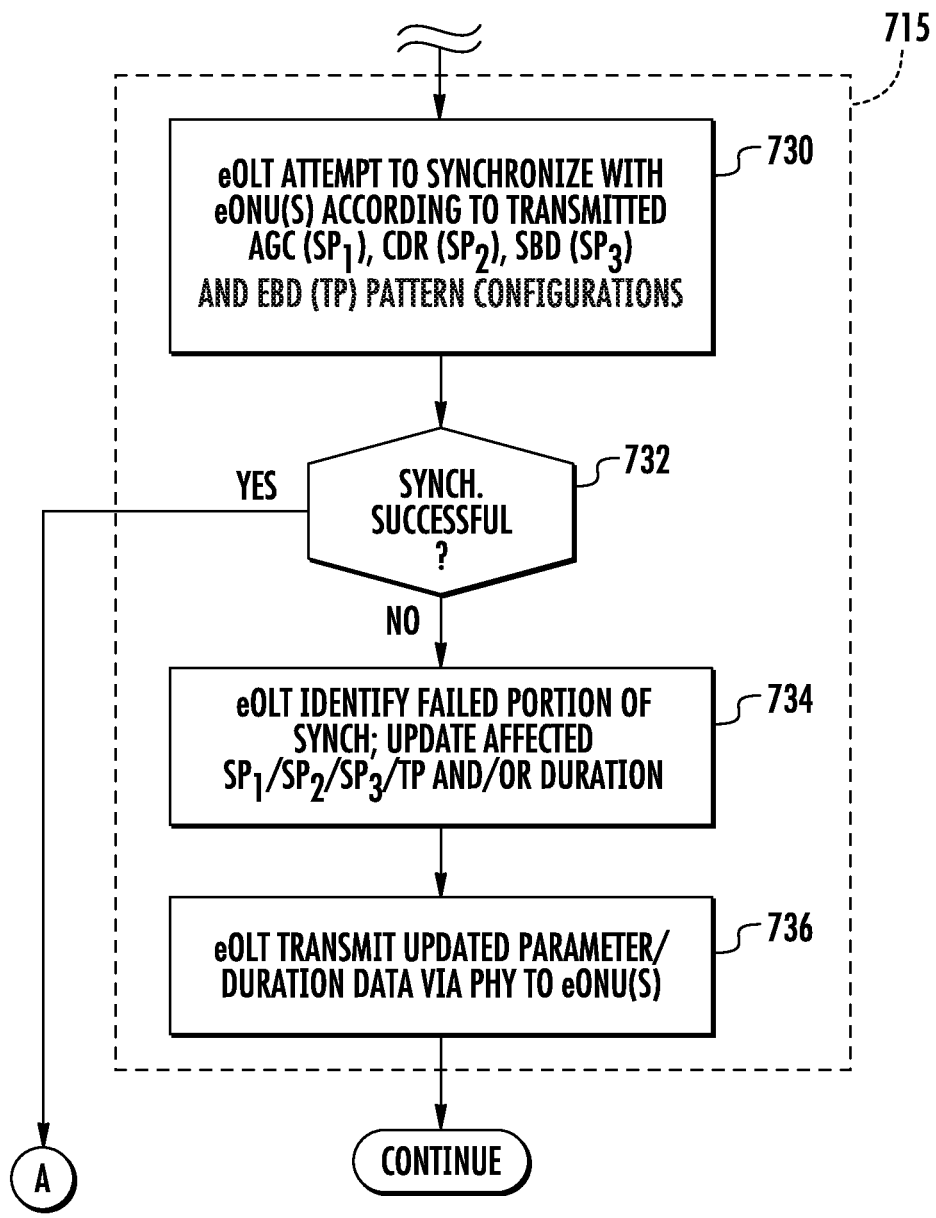
FIG. 7B is a logical flow diagram illustrating another implementation of the method of FIG. 7.

FIG. 7B illustrates one implementation of the method 700, particularly step 715 thereof. As shown, in the exemplary implementation, the eOLT first attempts to synchronize with a given eONU during a prescribed time slot per step 730. The synchronization includes in the exemplary embodiment receipt of the AGC, CDR, SBD and EBD "training" patterns transmitted from the eONU during the TDMA slot.

Per step 732, the eOLT then determines whether the synchronization (discovery) process was successful. If successful, the method 700 proceeds to the operational mode parameter selection of step 716. In not, the per step 734, the eOLT logic identifies the failed portion of the synchronization process (e.g., the clock could not be recovered from the CDR pattern), and an updated value of that parameter selected and transmitted to the relevant eOLT (e.g., via one or more additional control messages) per step 736.

Figure 8:
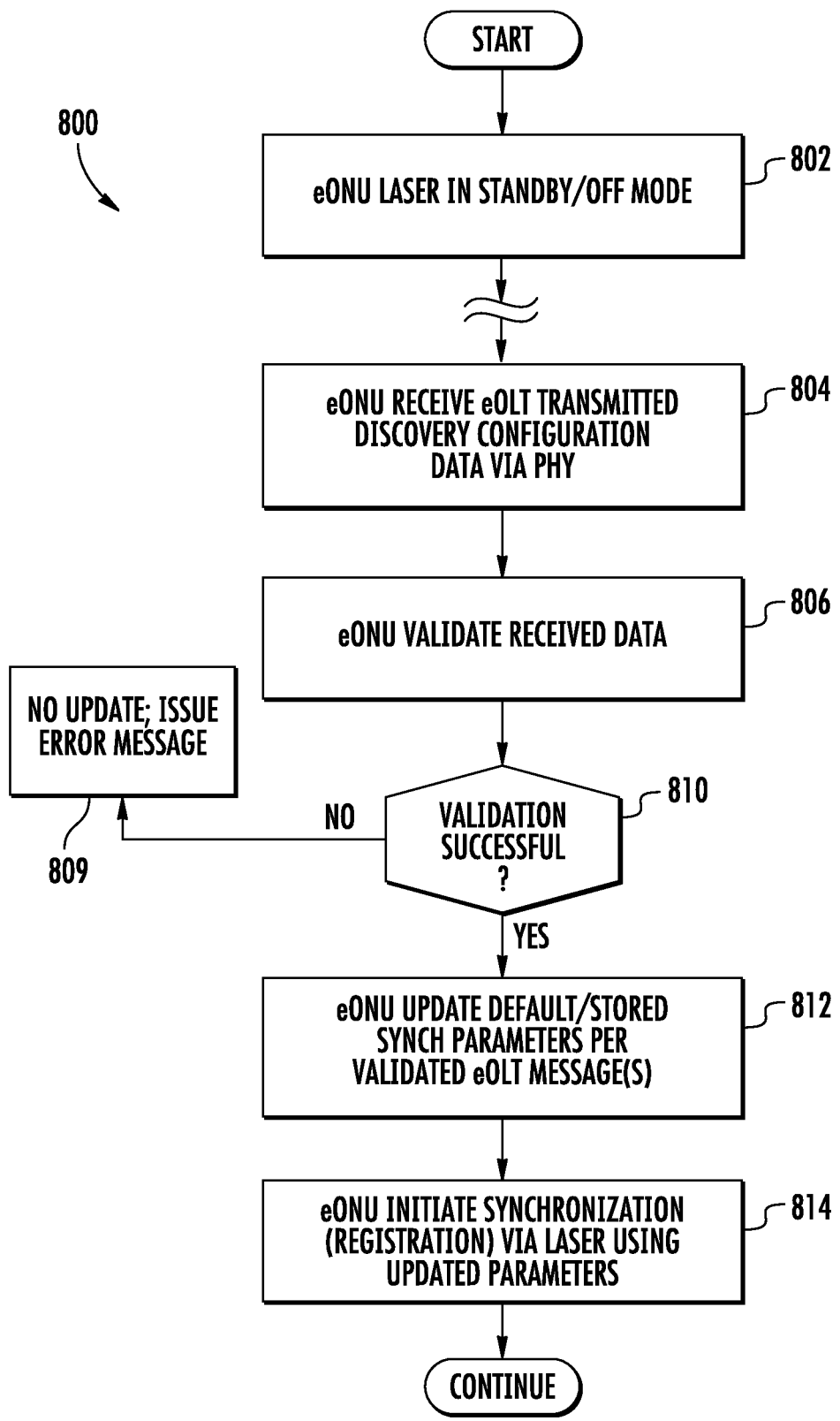
FIG. 8 is a logical flow diagram illustrating one embodiment of a generalized method for eONU discovery and synchronization by an unregistered eONU within a PON, according to the present disclosure.

Referring now to FIG. 8, one embodiment of a generalized method for eONU discovery and synchronization by an unregistered eONU within a PON is shown and described.

As shown, the method 800 begins with the eONU laser being held in an "off" or standby mode per step 802. As previously noted, such off/standby operation minimizes the introduction of optical noise onto the PHY during periods of non-use (non-access) of the PHY by that particular eONU.

Thereafter, per step 804, the eONU receives the discovery mode data transmitted by the eOLT (such as via the control message(s)). As previously described, this data is transmitted in one embodiment via a series of control messages sent by the cognizant eOLT to the eONU(s).

Per step 806, the received messages are then validated against one or more criteria. In one implementation, this validation includes checking the EN value to determine whether the number of messages received matches that value. Additional validation criteria may be used as well, such as for example whether the transmitted pattern values are within prescribed limits or formats, whether the overall length of the message(s) is proper, etc.

If validation of step 806 is successful at step 810, then per step 812, the eONU updates its stored configuration data with the transmitted synchronization parameters, and then initiates the synchronization protocol via the eONU laser, using the updated parameters (assuming no other preconditions are outstanding) per step 814.

Alternatively, if the validation of the control messages from the eOLT is not successful per step 810, the eONU logic ignores the message(s), performs no update, and issues an error message or flag. In one variant, this error message comprises another protocol (e.g., 802.3) control message that is sent to the eOLT or a proxy therefor, apprising the eOLT/proxy process of the protocol failure.

OFDM and Other Variants—

It will be appreciated that while the discussion of the exemplary embodiments of FIGS. 5-8 above are described in terms of a TDMA-based system, the various aspects of the present disclosure can be readily applied to other types of systems by those of ordinary skill when provided the present disclosure, including those utilizing OFDM (Orthogonal Frequency Division Multiplexing)/OFDMA or other multiple access schemes and/or modulation techniques. For example, time-frequency resources (aka "resource blocks") within an OFDM/OFDMA system may be used as the basis of access by the various eONUs with respect to the control messages issued by the eOLT (or other data communications between the entities). Other approaches (whether temporally based, such as FHSS) or non-temporally based (such as DSSS or even FDMA or the like) can be used consistent with the disclosure as well with proper adaptation.

eOLT Apparatus—

Figure 9:
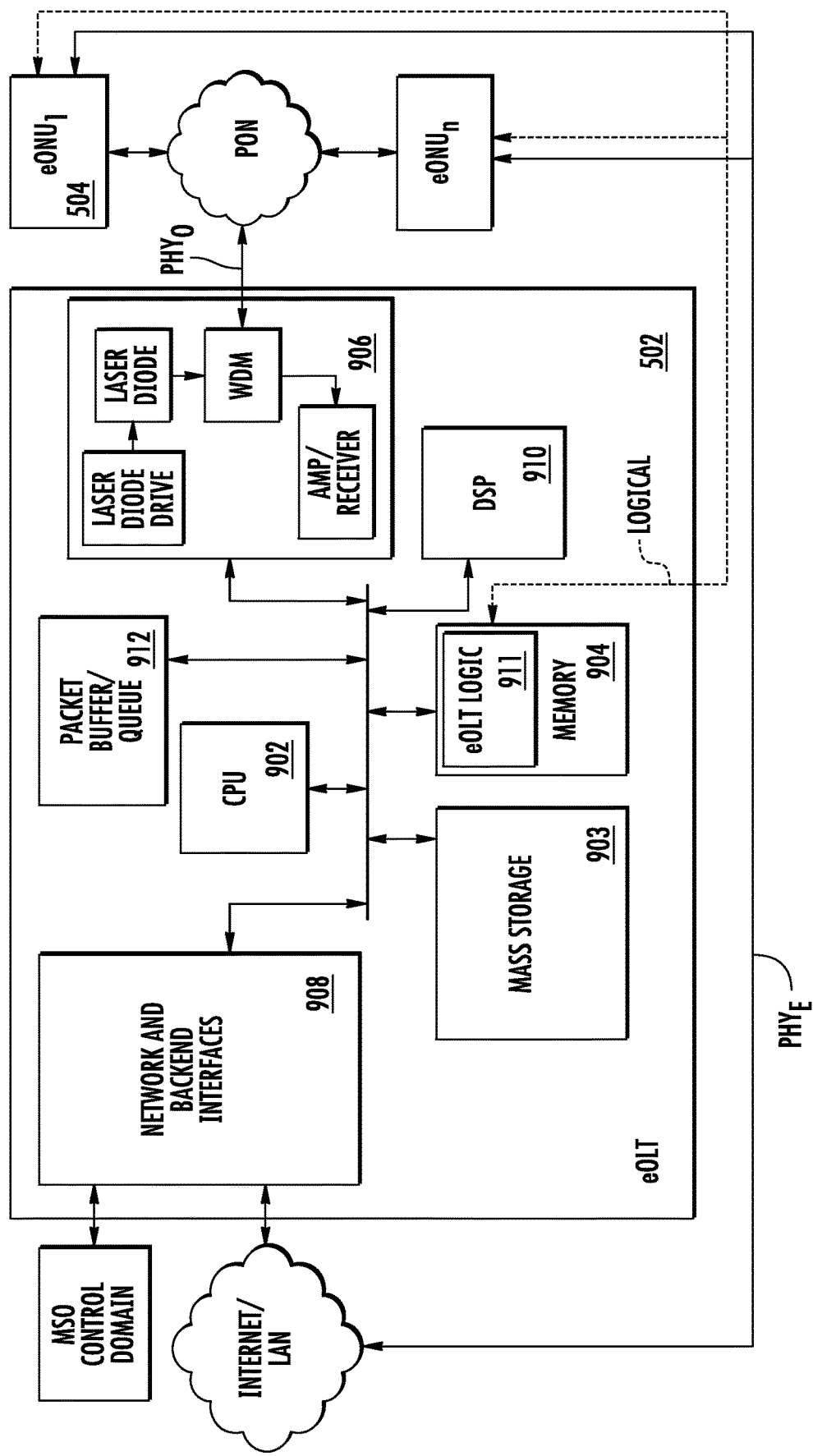
FIG. 9 is a functional block diagram of one embodiment of an eOLT apparatus for use in a PON, according to the present disclosure.

FIG. 9 illustrates one exemplary enhanced OLT (eOLT) configuration according to the present disclosure. As shown, the eOLT 502 includes: a processor (e.g., CPU such as a CISC device or SoC) 902, mass storage 903, a memory module 904, an optical network interface 906, and one or more backend/network interfaces 908. Artisans of ordinary skill in the related arts will readily appreciate, given the present disclosure, that the eOLT 502 may be virtualized and/or distributed within other core network entities, the foregoing apparatus being purely illustrative.

In one exemplary embodiment, the processor 902 may include one or more of a digital signal processor, microprocessor, field-programmable gate array, or plurality of processing components mounted on one or more substrates. The processor 902 may also comprise an internal cache memory (e.g., L1/L2/L3 cache). The processing subsystem is in communication with the mass storage 903 and the memory subsystem 904, the latter including memory which may for example comprise SRAM, flash, GDDRx, and/or SDRAM components. The memory subsystem may implement one or more of DMA type hardware, so as to facilitate data accesses as is well known in the art. The memory subsystem of the exemplary embodiment comprises program memory that contains computer-executable instructions which are executable by the processor subsystem.

A packet or data block buffer or queue 912 is also provided to store incoming data packets temporarily for before transmission by the optical interface 906 to the eONU(s), such as according to FIFO logic (e.g., for use by the DD function previously described for triggering power-up of the laser diode).

The processing apparatus 902 is configured to execute at least one computer program stored in memory 904 (e.g., non-transitory computer readable storage media). The computer program may include a plurality of computer readable instructions configured to, inter alia, generate the aforementioned control messages (e.g., SP_VALUE, SP_DURATION) for transmission to the eONUs 504 via the optical network interface 906 or the backend interface(s) 908. In one exemplary embodiment, the protocol stack of the eOLT comprises a MAC layer which communicates with a corresponding MAC layer process on the target eONUs, between which the various control messages are communicated, such as according to an IEEE Std 802.3 compliant MPCP or other protocol.

It will be appreciated that while the foregoing discusses software-based logic 911 for the eOLT functions described herein, the present disclosure contemplates other configurations, including for instance use of firmware/software, use of one or more ASICs (which inherently operate faster than software-based implementations), and combinations of the foregoing, depending on the attributes of the particular application.

In the exemplary configuration of the eOLT 502 shown, the optical network (PON) interface comprises a diode-based laser transceiver using WDM (wave division multiplexing), although other approaches such as DWDM may be used consistent with the disclosure.

A DSP 910 is also utilized within the architecture of the eOLT 502 to support processing of signals for the eOLT including for the optical interface(s) 906.

The network and backend interfaces 908 of the eOLT may include for example any number of wired or wireless PHYs and associated interfaces, such as Ethernet/GbE LAN, WLAN (e.g., 802.11), WMAN (e.g., 802.16), USB, IEEE-1394, or other. These interfaces enable both communication with one or more controlling or parent processes (e.g., a network controller within the MSO control domain, by which the operation of the eOLT can be controlled consistent with broader network operational conditions or goals), as well as non-optical communication with the various eONU 504 where needed/provided. As such, the protocol stack of the eOLT may include for instance network/transport layer protocols sufficient for e.g., Internet communication such as TCP/IP, UDP, etc.

eONU Apparatus—

Figure 10:
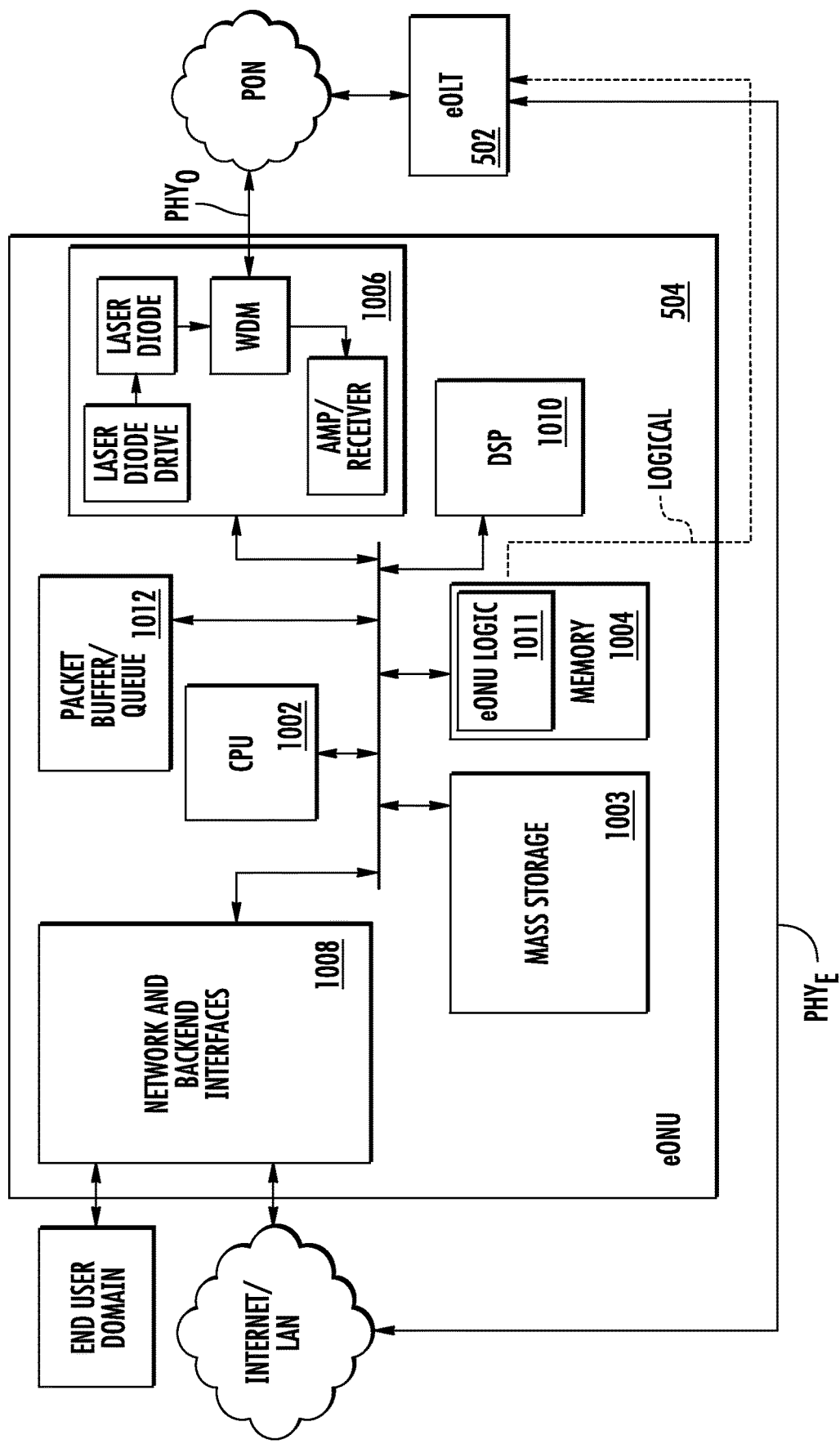
FIG. 10 is a functional block diagram of one embodiment of an eONU apparatus for use in a PON, according to the present disclosure.

FIG. 10 illustrates one exemplary embodiment of an enhanced ONU (eONU) 1000 according to the present disclosure. As shown, the eONU 504 includes: a processor (e.g., CPU such as a CISC device or SoC) 1002, mass storage 1003, a memory module 1004, an optical network interface 1006, and one or more backend/network interfaces 1008. Artisans of ordinary skill in the related arts will readily appreciate, given the present disclosure, that the eONU 504 may be virtualized and/or distributed within other edge or served premises entities or components, the foregoing apparatus being purely illustrative. For instance, the eONU functionality may be part of a premises modem or even end user device such as a PC or server.

In one exemplary embodiment, the processor 1002 may include one or more of a digital signal processor, microprocessor, field-programmable gate array, or plurality of processing components mounted on one or more substrates. The processor 1002 may also comprise an internal cache memory (e.g., L1/L2/L3 cache). The processing subsystem is in communication with the mass storage 903 and the memory subsystem 1004, the latter including memory which may for example comprise SRAM, flash, GDDRx, and/or SDRAM components. The memory subsystem may implement one or more of DMA type hardware, so as to facilitate data accesses as is well known in the art. The memory subsystem of the exemplary embodiment comprises program memory that contains computer-executable instructions which are executable by the processor subsystem.

A packet or data block buffer or queue 1012 is also provided to store incoming data packets temporarily for before transmission via the optical interface 1006 to the eOLT 502, such as according to FIFO logic (e.g., for use by the DD function previously described for triggering power-up of the laser diode).

The processing apparatus 1002 is configured to execute at least one computer program stored in memory 1004 (e.g., non-transitory computer readable storage media). The computer program may include a plurality of computer readable instructions configured to, inter alia, receive the aforementioned control messages (e.g., SP_VALUE, SP_DURATION) from the eOLT 502 via the optical network interface 1006 or the backend interface(s) 1008. In one exemplary embodiment, the protocol stack of the eONU comprises a MAC layer which communicates with a corresponding MAC layer process on the cognizant eOLT, between which the various control messages are communicated, such as according to an 802.3 compliant MPCP or other protocol. The eONU logic 1011 is further configured to un-encapsulate the various fields of the control messages and extract the $SP_1$-$SP_3$/TP data, and duration data as applicable, as well as the ancillary data (e.g., RF/BF, EN, etc.) and evaluate as described previously herein for possible update to the extant parameters stored in the memory 1004 or mass storage device 1003 of the eONU. As such, the eONU logic 1011 is further optionally configured to generate an error message or flag indicating that the eOLT communications have been ignored (e.g., due to EN not matching the actual messages received or other such condition).

Moreover, the eONU logic 1011 is also configured to implement the appropriate TDMA or other media access protocol(s) for e.g., optical communication with the eOLT MAC.

It will be appreciated that while the foregoing discusses software-based logic 1011 for the eONU functions described herein, the present disclosure contemplates other configurations, including for instance use of firmware/software, use of one or more ASICs (which inherently operate faster than software-based implementations), and combinations of the foregoing, depending on the attributes of the particular application.

In the exemplary configuration of the eONU 504 shown, the optical network (PON) interface comprises a diode-based laser transceiver using WDM (wave division multiplexing), although other approaches such as DWDM may be used consistent with the disclosure. OFDM modulation may also be applied, such that particular time/frequency resource blocks are assigned to the given eONU for communication with the eOLT (thereby providing multiple access capability for the eOLT). The selected multiplexing/modulation technique used in the eONU matches that of the cognizant eOLT, such that the two devices can communicate in the optical domain (e.g., during the assigned TDMA time slot, or using the appropriate OFDM time-frequency resource blocks)

A DSP 1010 is also utilized within the architecture of the eONU 504 to support processing of signals for the eOLT including for the optical interface(s) 1006.

The network and backend interfaces 1008 of the eOLT may include for example any number of wired or wireless PHYs and associated interfaces, such as Ethernet/GbE LAN, WLAN (e.g., 802.11), WMAN (e.g., 802.16), 5G-NR (e.g., 3GPP TS 38.xxx), USB, IEEE-1394, or other. These interfaces enable both communication with one or more downstream or served devices (e.g., at a user's premises; see FIG. 5), as well as non-optical communication with the eOLT 502 where needed/provided. As such, the protocol stack of the eONU may include for instance network/transport layer protocols sufficient for e.g., Internet communication such as TCP/IP, UDP, etc., as well as protocols needed to support delivery of services to the served premises and networks thereof, the latter which may include for instance client devices such DSTBs, gateways, WLAN APs, femtocells (e.g., EUTRAN 4G/4.5G devices), MoCA coaxial wiring, CAT-5/6 wiring, and others.

Implementation Example (NG-EPON)-

Figure 11:
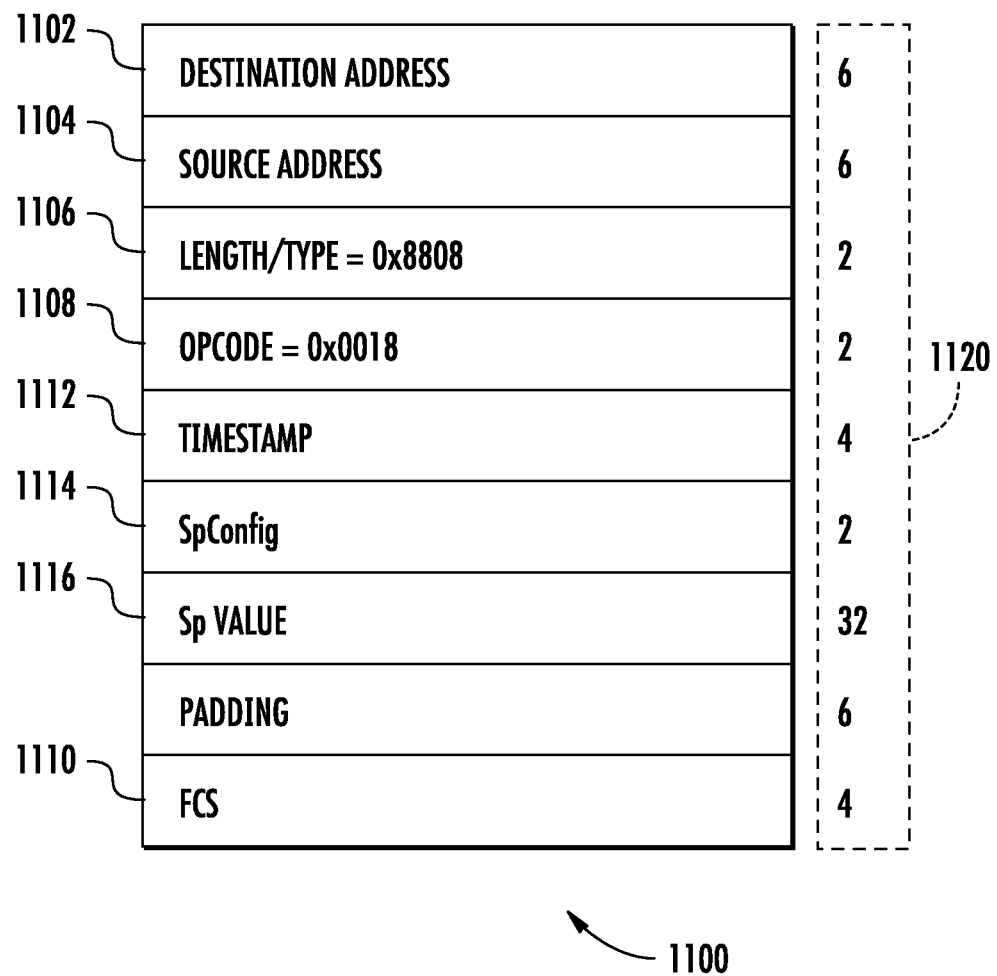
FIG. 11 is a tabular representation of an exemplary embodiment of a protocol control message for use in a next generation PON (NG-PON), according to the present disclosure.

Referring now to FIG. 11, one exemplary implementation example of the proposed pattern announcement protocol (PPAP) in the context of an NG-EPON system (e.g., one defined under the IEEE P802.3ca project at the date of this filing) is shown and described in detail. As noted previously, the various aspects of the present disclosure can be applied by one of ordinary skill, given this disclosure, to any number of different: (i) PON types and protocols; (ii) access schemes (e.g., TDMA-based, OFDM-based, or even FDMA/WDMA-based), and (iii) PHY media (e.g., optical fiber, differentially signaled twisted pair, etc.), requiring temporal or other synchronization. Hence, the following example merely illustrates one such application.

In the example of FIG. 11, all control messages associated with the eONU discovery, registration, and upstream channel access arbitration are implemented using the Multi Point MAC Control (MPCP) protocol (specified in IEEE Std 802.3, Clause 64 for 1G-EPON, Clause 77 for 10G-EPON, and Clause 144 (under development) for NG-EPON, incorporated herein by reference in its entirety), representing a specialized type of MA Control protocol.

The SP_VALUE message defined herein is, given the size limitation of the MPCP data units (frames) to 64 bytes, and the target size of the data block of 257 bits, implemented in a new message, with the format 1100 shown in FIG. 11. Specifically, the Destination Address field 1102, Source Address field 1104, Length/Type field 1106, Opcode field 1108, FCS field 1110, and Timestamp field 1112 are required by the MPCP data unit (MPCPDU) structure, and are populated with data accordingly by the respective implementation. The number of bytes 1120 associated with each field is shown as well.

The value of Opcode field 1108 is assigned and fixed in one embodiment. For instance, for this SP_VALUE message 1100, the next available Opcode value is 0x0018 at the time of writing. Other values are allowed, as long as the eOLT and eONU implementation agree on the actual Opcode value for this control message 1100.

The SpValue field 1116 carries the actual pattern value. In the present implementation, a 257-bit long pattern value is selected based on the line code selected for NG-EPON at the time of this writing (256b/257b), but may be readily adapted for other line codes or values. The 257-bit value is encoded into 32 bytes as shown, representing bits 1 through 256 of the 257-bit long pattern value. Bit 0 is encoded into bit 15 of the SpConfig field 1114, where the SpConfig field is defined as follows:

Bit 1: SpBalanced flag, representing the Balanced Flag (BF) as previously defined herein;

Bit 2: SpReversed flag, representing the Reversed Flag (RF) as previously defined herein;

Bit 3-4: Spindex value, indicating the type of pattern value carried in the given SP_VALUE message as previously defined herein, where a value of "0" indicates SP$_1$ pattern, a value of "1" indicates the SP$_2$ pattern, a value of "2" indicates the SP$_3$ pattern, and a value of "3" indicates the TP pattern;

Bit 5-6: SpCount value, indicating the target number of patterns announced by the eOLT, as previously defined herein; and Bit 15: SpValue bit 0, completing the 257-bit long pattern value.

Other bits within the SpConfig field 1114 are reserved, and are transmitted as "0" (and ignored on reception at the eONU).

As previously noted, the SP_VALUE MPCPDU may be transmitted on a broadcast channel to all eONUs in data communication with the given eOLT, advantageously providing, inter alia, a simple means of delivering initial set of pattern values to all unregistered eONUs. Additionally, this message may be also delivered on a unicast channel to a selected target eONU, such as when specific changes are needed to at least one of the pattern values and/or associated pattern configuration to improve the eONU performance. Multicast to e.g., prescribed subsets of the eONUs may also be utilized consistent with the SP_VALUE MPCPDU.

The SP_COUNT (i.e., the expression of the generic SP_DURATION message using an SP_COUNT parameter; i.e., a number of blocks that are transmitted for each sequence) for the discovery mode of operation is, in one implementation, encoded into the remaining padding field in the DISCOVERY_GATE MPCPDU (already defined in the current MPCP standard); i.e., an additional 8 octets of the padding zone are assigned to the respective pattern counts as follows:

1. Octet X, X+1: SP$_1$ pattern count for the discovery operation;
2. Octet X+2, X+3: SP$_2$ pattern count for the discovery operation;
3. Octet X+4, X+5: SP$_3$ pattern count for the discovery operation; and
4. Octet X+6, X+7: TP pattern count for the discovery operation.

The starting location within the DISCOVERY_GATE MPCPDU message is in one implementation designated with a prescribed value (e.g., marked with "X"), and depends on other factors, such as for example any other changes to the DISCOVERY_GATE MPCPDU, such as those that a respective standardization project may add to the given control message. In this example, the DISCOVERY_GATE MPCPDU is always transmitted on the broadcast channel (delivered to all connected eONUs), and processed only by unregistered eONUs, providing a way to deliver necessary information (e.g., SP_COUNT for the discovery operation) to all unregistered eONUs before they are allowed to attempt registration in the system.

In this example, the SP_COUNT for the normal (granting) operational mode is encoded into the remaining padding field in the REGISTER MPCPDU (also defined in the current standard); i.e., an additional 8 octets of the padding zone are assigned to the respective pattern counts as follows:

1. Octet X, X+1: SP$_1$ pattern count for the normal (granting) operation mode;
2. Octet X+2, X+3: SP$_2$ pattern count for the normal (granting) operation mode;
3. Octet X+4, X+5: SP$_3$ pattern count for the normal (granting) operation mode; and
4. Octet X+6, X+7: TP pattern count for the normal (granting) operation mode.

The starting location within the REGISTER MPCPDU message is similarly designated (for instance marked with the aforementioned "X"), and depends on other factors, such as e.g., any other changes to the REGISTER MPCPDU that the respective standardization project may add to the control message. By default, the REGISTER MPCPDU in the present example is delivered to a specific eONU on a unicast logical link, and processed by the target eONU only, hence advantageously providing a way for the eOLT to deliver necessary information (e.g., SP_COUNT for the normal operation mode) to the selected eONU. Additionally, the REGISTER MPCPDU may be transmitted by the eOLT at any point of time without causing a change in the state of the eONU registration, thereby further providing the means to deliver any updates (e.g., to the SP_COUNT) for the normal operation mode for the given eONU.

Peer-Based and Other Embodiments

While the exemplary embodiments of the protocol, methods and apparatus described above are generally consistent with a unidirectional control flow (i.e., eOLT acting as a "master" or "director" and the various eONUs acting as "agents" or "followers"), the present disclosure also contemplates other types of relationships between the various entities when implementing the enhanced discovery, synchronization and operation functions described herein, whether in the context of a PON implementation, or otherwise.

For example, in one alternate configuration, one or more of the eONUs 504 may be configured with additional logic such that it can at some level participate in as a peer or input source in the parameter (e.g., $SP_1$-$SP_3$ and TP, duration) selection process. For instance, in one variant, the logic module 1011 of the eONU 504 is configured to transmit data to the cognizant eOLT 502 (such as via repurposed padding or other unused data within an extant control/reply message) that may be of use by the eOLT logic 911 in selecting the optimized discovery mode and/or operational (normal) mode parameters. Such data may include for instance historical data on operation of that eONU (e.g., such as where the eONU has only historically been used very infrequently, and hence may be able to tolerate settings not tolerated by more frequently used devices on the PON), data regarding test results for various components of the eONU (e.g., a "weak" or "strong" laser diode as compared to nominal, and hence modification of the AGC pattern/duration to compensate), and/or error/flag data (e.g., data on the incidence of failures or errors in the MAC/MPCP protocol or the broader protocol stack in general, thereby indicating general health or reliability of the eONU or components thereof). This data reporting may also include data obtained by the eONU 504 from proxy or downstream devices within the PON (or served thereby), such as e.g., high data error rates or other operational issued encountered by downstream devices, or optical power measurements from other nodes within the PON.

Alternatively or in conjunction with the foregoing data reporting functions, the eONU logic 1011 can be configured with additional intelligence such that it can evaluate the various data it logs or otherwise obtains (e.g., test data, historical operations data, error data, etc.), and generate recommended values for one or more parameters (or adjustments to the initial parameters set by the eOLT), and communicate them to the eOLT such as via a control message protocol or other inter-process (e.g., MAC-MAC) communication. As such, portions of the eOLT logic 911 can also be "distributed" or virtualized within other components (including one or more of the eONUs) within the PON.

Moreover, the roles assumed by the eOLT and eONU may vary as a function of time or operating mode; e.g., wherein in certain operating modes, the eOLT assumes the "master" role, and in other operating modes, the eOLT assumes a "peer" role such that it can receive data and inputs from the "smart" eONU as described above. By virtue of its position within the PON, the eOLT is always cognizant over timing and other multiple access-related issues (including TDMA slot and bandwidth allocation); however, it can also be configured to utilize the capabilities of the various eONU within the PON for provision of data and enhanced optimization functions.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. Computer readable apparatus comprising a non-transitory storage medium, the non-transitory storage medium comprising at least one computer program having a plurality of instructions, the plurality of instructions configured to, when executed on a digital processing apparatus of a computerized apparatus, cause the computerized apparatus to:

receive first data related to a first plurality of synchronization parameters, the first plurality of synchronization parameters configured for use in at least two phases of a synchronization process between the computerized apparatus and a computerized network apparatus, the at least two phases comprising a discovery phase and a validation phase;

identify second data related to a second plurality of synchronization parameters accessible by the computerized apparatus;

based at least in part on at least one of (i) the received first data or (ii) the identified second data, cause transmission of third data to the computerized network apparatus via a passive optical network (PON), the third data configured to cause initiation of the synchronization process; and based at least in part on (i) the received first data and (ii) a determination that an update is needed, update the second plurality of synchronization parameters accessible by the computerized apparatus;

wherein the update is configured to reduce a time required for performance of at least one process associated with the synchronization process.

2. The computer readable apparatus of claim 1, wherein the first plurality of synchronization parameters comprise prescribed parameters determined, via the computerized network apparatus, based at least on another synchronization process between at least one service node of the PON and the computerized network apparatus.

3. The computer readable apparatus of claim 1, wherein the plurality of instructions are further configured to, when executed on the digital processing apparatus, cause the computerized apparatus to validate the received first data against one or more prescribed criteria, the validation (i) comprising a confirmation of a proper format or length of the first plurality of synchronization parameters, the proper format or length being compatible for use in the synchronization process, and (ii) performed as part of the validation phase.

4. The computer readable apparatus of claim 3, wherein the one or more prescribed criteria comprise a match between a number of messages included in the first data and an expected number of the messages, the expected number determined by an evaluation of data included in the received first data, the messages configured to be utilized for the synchronization process.

5. The computer readable apparatus of claim 1, wherein:
the PON comprises an Ethernet PON; and
the third data comprises an acknowledgement (ACK) message according to Multi Point Control Protocol (MPCP), the ACK message indicative of a confirmation of the receipt of the first data.

6. The computer readable apparatus of claim 1, wherein:
the first data comprises a plurality of control messages from an optical line terminal within the PON;
the second data comprises at least one prescribed validation criterion; and
the caused transmission of the third data is further based at least on a comparison of a quantity of the plurality of control messages with at least one aspect of the at least one prescribed validation criterion.

7. Computerized network apparatus for use in a passive optical network (PON), the computerized network apparatus comprising:
a PHY (physical layer) apparatus configured to support optical data communication with at least one service node of the PON;
digital processing apparatus in data communication with the PHY apparatus; and
storage apparatus in data communication with the digital processing apparatus and comprising a non-transitory storage medium, the non-transitory storage medium comprising at least one computer program having a plurality of instructions, the plurality of instructions configured to, when executed on the digital processing apparatus, cause the computerized network apparatus to:
determine at least two bit patterns for at least one synchronization parameter, the at least two bit patterns comprising (i) a first bit pattern optimized for performance of a gain control adjustment, and (ii) a second bit pattern optimized for performance of a clock signal recovery, the optimizations relating to a respective time required for the performance of the gain control adjustment and the clock signal recovery, the at least one synchronization parameter configured for use in a synchronization process between the at least one service node and the computerized network apparatus;
configure the at least two bit patterns into at least one protocol data message; and
transmit, via the PHY apparatus, the at least one protocol data message to the at least one service node.

8. The computerized network apparatus of claim 7, wherein the synchronization process comprises (i) a first process relating to the gain control adjustment, and (ii) a second process relating to the clock signal recovery.

9. The computerized network apparatus of claim 7, wherein:
the first bit pattern comprises a pattern which maximizes a number of data "1s"; and
the second bit pattern comprises a pattern which maximizes a number of data value transitions of at least one of: (i) from data "0" to data "1", or (ii) from data "1" to data "0".

10. The computerized network apparatus of claim 7, further comprising a second PHY apparatus in data communication with the digital processing apparatus and configured to support data communication with the at least one service node of the PON, and wherein the plurality of instructions are further configured to, when executed on the digital processing apparatus:
receive data relating to an error message related to at least a portion of the transmitted at least one protocol data message; and
based at least on the received data relating to the error message, re-transmit the at least one protocol data message, via the second PHY apparatus, to the at least one service node.

11. The computerized network apparatus of claim 7, wherein the performance of the gain control adjustment occurs during a first defined phase, the first defined phase occurring prior to the performance of the clock signal recovery during a second defined phase distinct from the first defined phase.

12. A computerized method of operating a passive optical network (PON), the computerized method comprising:
determining a plurality of synchronization parameters to be used during at least two different phases of synchronization between at least one service node and a controller node of the PON, the plurality of synchronization parameters comprising (i) a first bit pattern configured to optimize at least a first transmit characteristic, and (ii) a second bit pattern configured to optimize at least a second transmit characteristic; and
transmitting data indicative of at least the first bit pattern and the second bit pattern, to the at least one service node via at least one protocol data message, the at least one protocol data message configured to cause the at least one service node to utilize one or more of the first bit pattern or the second bit pattern during at least one subsequent discovery or synchronization process;
wherein the one or more of the first bit pattern or the second bit pattern is configured to reduce a time required for performance of one or more of the at least one subsequent discovery or synchronization process.

13. The computerized method of claim 12, wherein the at least two different phases comprise: (i) a gain phase relating to signal power transmitted by the at least one service node onto the PON; and (ii) a clock signal recovery phase.

14. The computerized method of claim 13, wherein the at least two different phases further comprise a payload phase.

15. The computerized method of claim 14, wherein the payload phase comprises a phase during which FEC (forward error correction) protected payload data is transmitted, the payload phase delineated by at least two burst delimiter values.

16. The computerized method of claim 13, wherein the at least one service node comprises an ONU (optical network unit), and the controller node comprises an OLT (optical line terminal).

17. The computerized method of claim 12, wherein the transmitting of the data indicative of the at least the first bit pattern and the second bit pattern comprises:
  determining that the at least one service node has not transmitted, within a prescribed time period, data representative of a response to at least a portion of the data indicative of the at least the first bit pattern and the second bit pattern, the response related to a confirmation of receiving the at least portion of the data indicative of the at least the first bit pattern and the second bit pattern; and
  based at least in part on the determining that the at least one service node has not transmitted the data representative of the response, re-transmitting the data indicative of the at least the first bit pattern and the second bit pattern to the at least one service node.

18. The computerized method of claim 17, wherein the re-transmitting comprises re-transmitting the data indicative of the at least the first bit pattern and the second bit pattern via at least a second protocol data message, the at least second protocol data message configured for data communication according to a second communication protocol which is different from a first communication protocol associated with the at least one protocol data message; wherein:
  the first communication protocol is utilized for data communication via a first PHY (physical layer) interface of the at least one service node; and
  the second communication protocol is utilized for data communication via a second PHY interface of the at least one service node.

19. The computerized method of claim 17, wherein the re-transmitting comprises transmitting a different number of protocol data messages relative to a number of the at least one protocol data message, the different number of protocol data messages comprising a varied number of synchronization parameters in at least one of the different number of protocol data messages relative to a number of synchronization parameters included in one or more of the at least one protocol data message.

20. The computerized method of claim 12, wherein the first bit pattern comprises a bit pattern utilized during an Automatic Gain Control (AGC) period, and the second bit pattern comprises a bit pattern utilized during a Clock Data Recovery (CDR) period.

* * * * *